(12) United States Patent
Dess et al.

(10) Patent No.: US 12,115,490 B2
(45) Date of Patent: Oct. 15, 2024

(54) SYSTEM AND METHOD FOR SUBSTANCE REMOVAL

(71) Applicant: Ivy Capture Inc., San Jose, CA (US)

(72) Inventors: Peter Colin Dess, San Jose, CA (US); Jaya Rao, San Jose, CA (US); James Kronik, San Jose, CA (US); Rene Alejandro Mendez, San Jose, CA (US)

(73) Assignee: Ivy Capture Inc., San Jose, CA (US)

( * ) Notice: Subject to any disclaimer, the term of this patent is extended or adjusted under 35 U.S.C. 154(b) by 0 days.

(21) Appl. No.: 18/435,339

(22) Filed: Feb. 7, 2024

(65) Prior Publication Data

US 2024/0261718 A1    Aug. 8, 2024

Related U.S. Application Data

(60) Provisional application No. 63/597,554, filed on Nov. 9, 2023, provisional application No. 63/448,086, filed on Feb. 24, 2023, provisional application No. 63/443,752, filed on Feb. 7, 2023.

(51) Int. Cl.
| | | |
|---|---|---|
| *B01D 53/14* | (2006.01) | |
| *B01D 53/04* | (2006.01) | |
| *B01D 53/26* | (2006.01) | |
| *B01D 53/62* | (2006.01) | |

(52) U.S. Cl.
CPC ..... *B01D 53/0438* (2013.01); *B01D 53/0454* (2013.01); *B01D 53/14* (2013.01); *B01D 53/1475* (2013.01); *B01D 53/265* (2013.01); *B01D 53/268* (2013.01); *B01D 53/62* (2013.01); *B01D 2252/00* (2013.01); *B01D 2253/102* (2013.01); *B01D 2253/25* (2013.01);
(Continued)

(58) Field of Classification Search
CPC ............ B01D 53/0438; B01D 53/0454; B01D 53/265; B01D 53/268; B01D 53/14; B01D 53/1425; B01D 53/1456; B01D 53/1475; B01D 53/18; B01D 2253/102; B01D 2253/25; B01D 2252/00; B01D 2257/504; B01D 2259/4009; B01D 2259/4508
USPC ............... 95/8, 11, 187, 188, 191, 193, 236; 96/145, 143, 146, 255, 244, 290; 423/220, 226, 228, 229
See application file for complete search history.

(56) References Cited

U.S. PATENT DOCUMENTS

| | | | |
|---|---|---|---|
| 2,859,257 A | * | 11/1958 | Hess, V ................ C10G 25/08 95/110 |
| 8,834,605 B2 | | 9/2014 | Aines et al. |
| 8,945,279 B2 | | 2/2015 | Aines et al. |

(Continued)

OTHER PUBLICATIONS

Hornbostel, K. M., et al., "Packed and fluidized bed absorber modeling for carbon capture with micro-encapsulated sodium carbonate solution", Lawerence Livermore National Laboratory, LLNL-JRNL-776802, Jun. 5, 2019.

*Primary Examiner* — Frank M Lawrence, Jr.
(74) *Attorney, Agent, or Firm* — Jeffrey Schox; Diana Lin

(57) ABSTRACT

In variants, an air treatment module can include a sorption module defining a sorption cavity, an air intake channel, an air exhaust channel, and a target substance exhaust channel. The air treatment module can include a sorbent encapsulated within a sorbent structure (e.g., microencapsulated carbon sorbent) which can sorb carbon dioxide from air passing through the sorption cavity. The air treatment module can desorb carbon dioxide from the air and store the carbon dioxide in long term storage.

20 Claims, 15 Drawing Sheets

(52) U.S. Cl.
CPC ............. *B01D 2257/504* (2013.01); *B01D 2259/4009* (2013.01); *B01D 2259/4508* (2013.01)

(56) References Cited

U.S. PATENT DOCUMENTS

| | | |
|---|---|---|
| 11,173,461 B2 | 11/2021 | Ye et al. |
| 11,351,514 B2 | 6/2022 | Ye et al. |
| 2004/0065205 A1* | 4/2004 | Nalette .............. B01D 53/0446 96/135 |
| 2014/0298833 A1 | 10/2014 | Lesmerises et al. |
| 2018/0272273 A1* | 9/2018 | Aines .................. B01D 69/142 |
| 2019/0240611 A1* | 8/2019 | Nguyen ............. B01D 53/1493 |
| 2020/0009504 A1 | 1/2020 | Eisenberger |
| 2021/0283545 A1 | 9/2021 | Meirav et al. |

\* cited by examiner

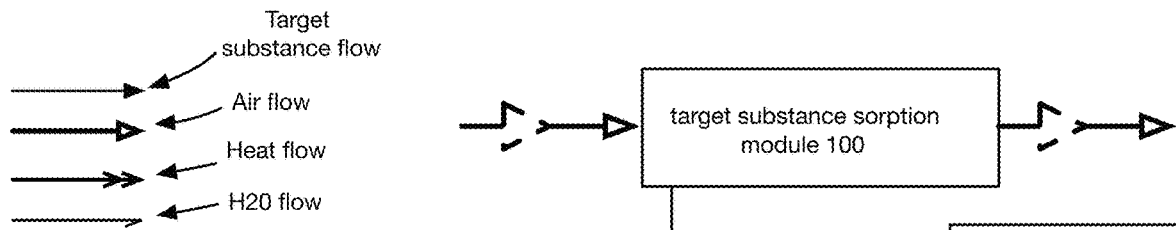
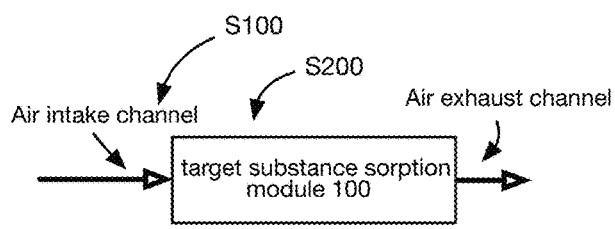
FIGURE 10A
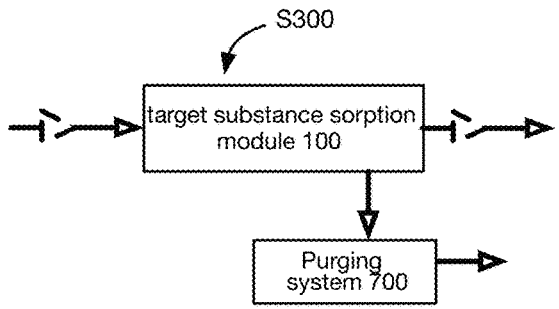
FIGURE 10B
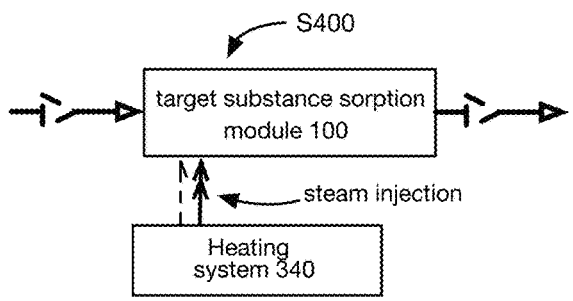
FIGURE 10C
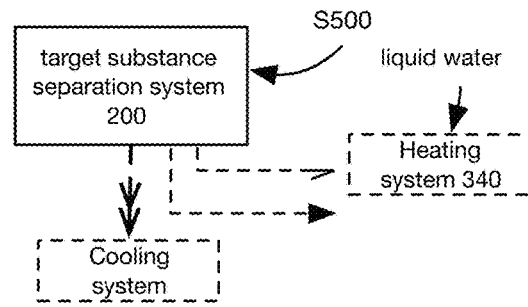
FIGURE 10D
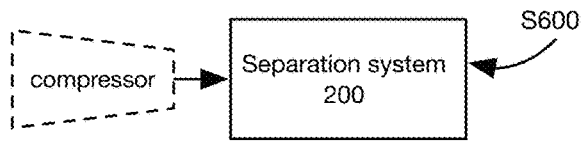
FIGURE 10E
FIGURE 10F
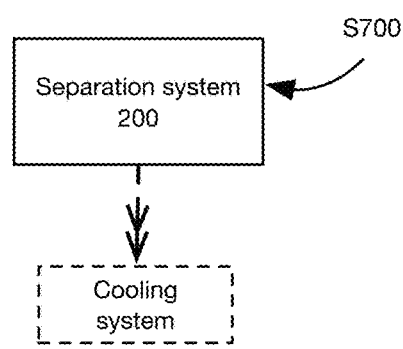
FIGURE 10G

SYSTEM AND METHOD FOR SUBSTANCE REMOVAL

CROSS REFERENCE TO RELATED APPLICATIONS

This application claims the benefit of U.S. Provisional Application No. 63/443,752, filed 7 Feb. 2023, U.S. Provisional Application No. 63/448,086, filed 24 Feb. 2023, and U.S. Provisional Application No. 63/597,554, filed 9 Nov. 2023, each of which is incorporated in its entirety by this reference.

STATEMENT OF GOVERNMENT SUPPORT

This invention was made with government support under Award Number DE-SC0023814 awarded by the Department of Energy. The government has certain rights in the invention.

TECHNICAL FIELD

This invention relates generally to the substance capture field, and more specifically to a new and useful substance capture system in the substance capture field.

BRIEF DESCRIPTION OF THE FIGURES

FIGS. 10A-10G are schematic representations of different steps of a variant the method.

DETAILED DESCRIPTION

The following description of the embodiments of the invention is not intended to limit the invention to these embodiments, but rather to enable any person skilled in the art to make and use this invention.

1. Overview

Figure 1:
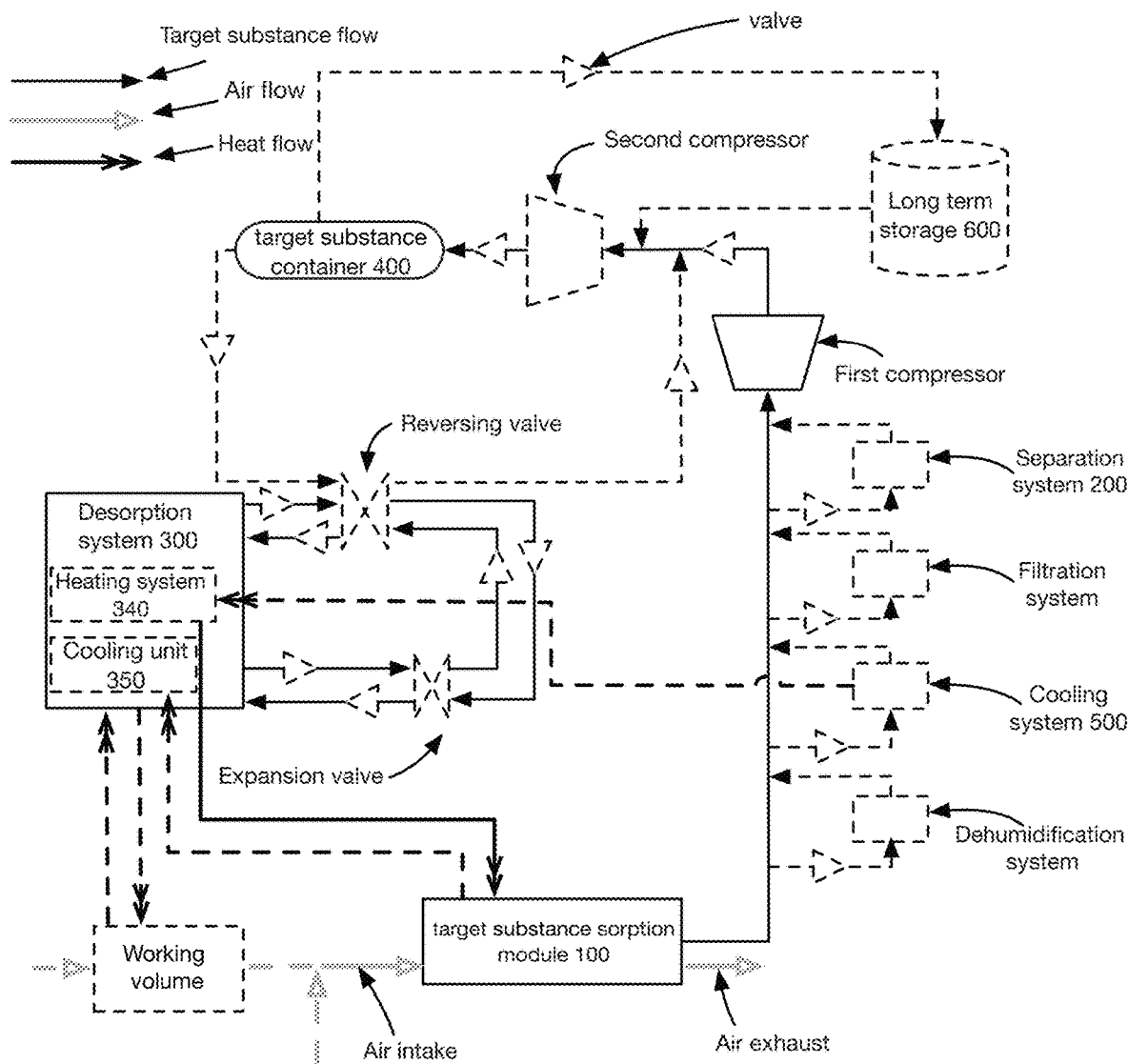
FIG. 1 is a schematic representation of an illustrative example of system components.

As shown in FIG. 1, the system can include: a sorption module 100, a separation system 200, a desorption system 300, a target substance container 400, a cooling system 500, flow channels, sensors, a controller, and/or other components. The system can function to reduce the concentration of a target substance within a working volume (e.g., an air source, a building interior, etc.). In specific examples, the system can be operated as a direct-air capture system for removing carbon dioxide and/or other greenhouse gasses from indoor or outdoor air (e.g., example shown in FIG. 2).

Figure 5:
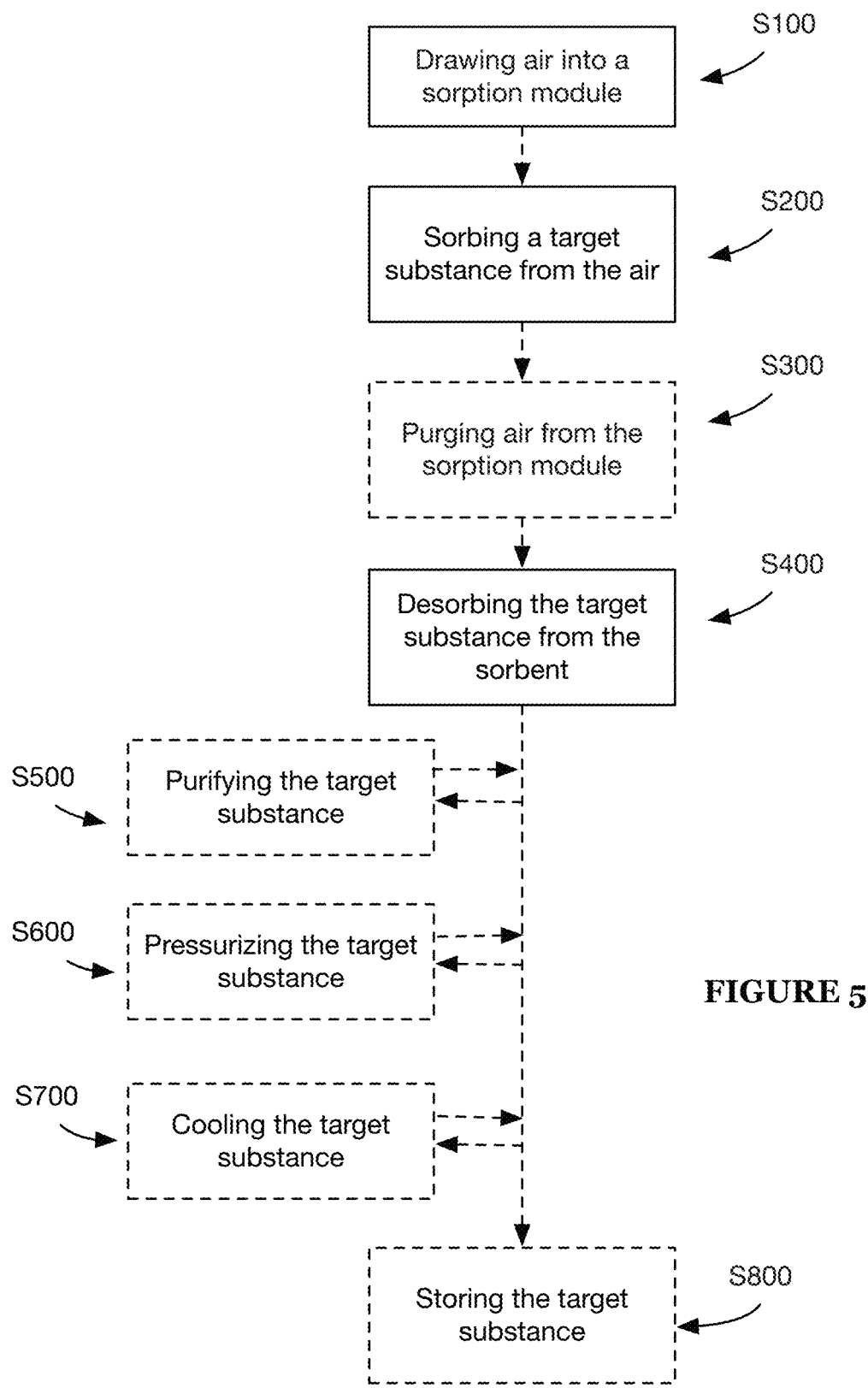
FIG. 5 is a schematic representation of a variant of the method.

As shown in FIG. 5, in variants system operation can include: drawing air into a sorption module S100, sorbing a target substance from the air S200, optionally purging air from the sorption module S300, desorbing the target substance from the sorbent S400, optionally purifying the target substance S500, optionally pressurizing the target substance S600, optionally cooling the target substance S700, and optionally storing the target substance S800. However, the system can be otherwise operated. All or portions of the aforementioned processes can be performed in real time (e.g., responsive to a request), iteratively, concurrently, asynchronously, periodically, and/or at any other suitable time. All or portions of the aforementioned processes can be performed automatically, manually, semi-automatically, and/or otherwise performed.

Figure 9A:
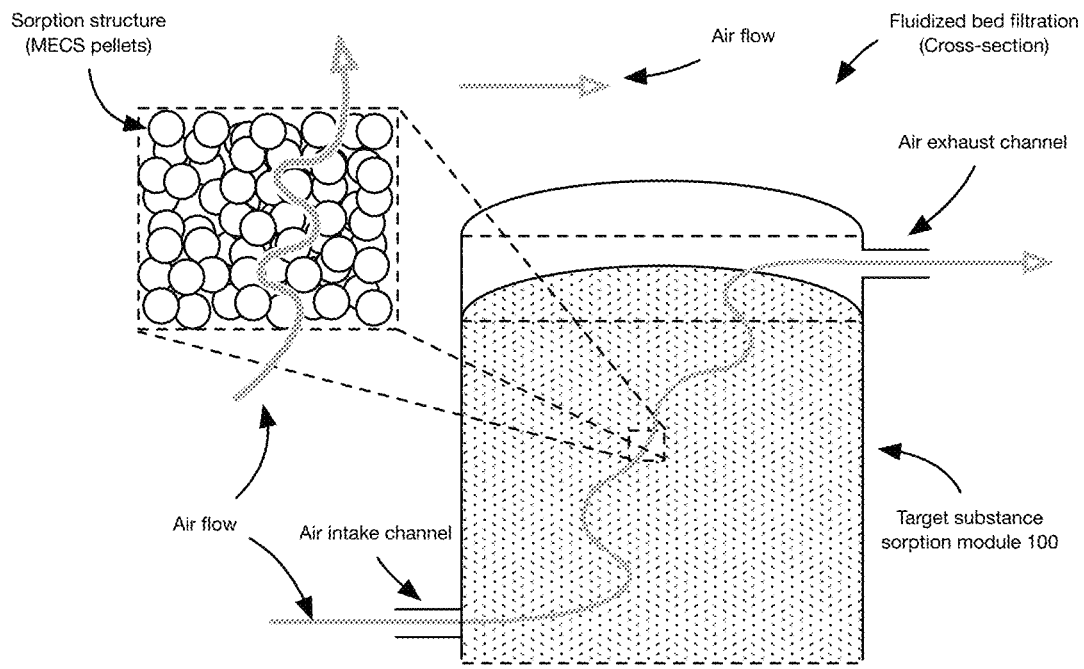
FIGS. 9A-9F are schematic representations of variants of different sorption modules and sorbent structures.
Figure 9B:
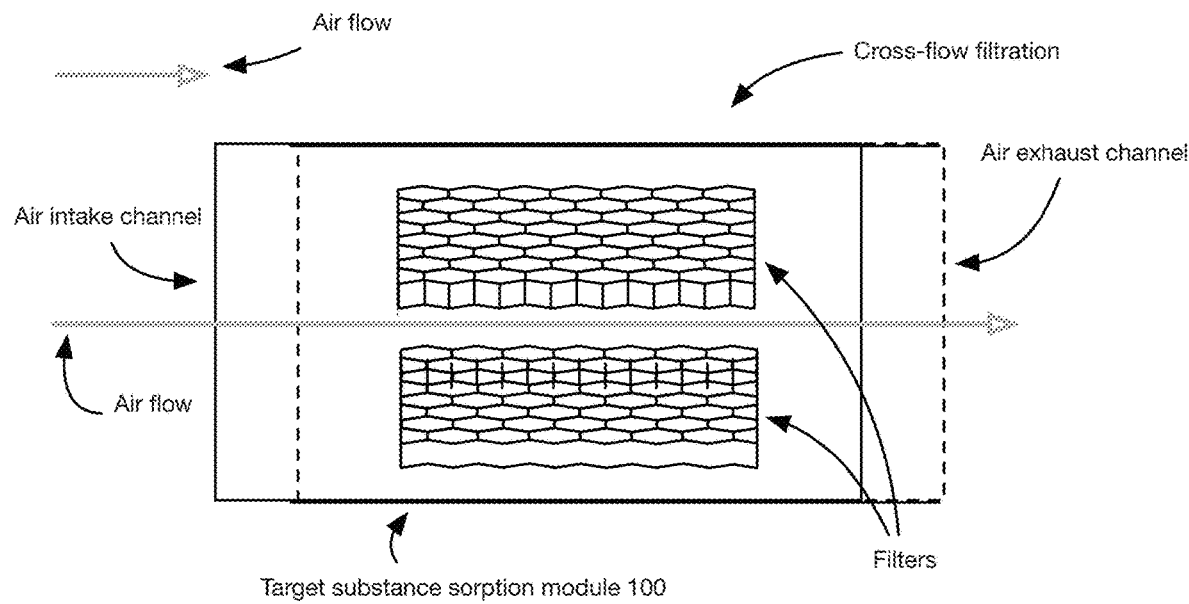
Figure 9C:
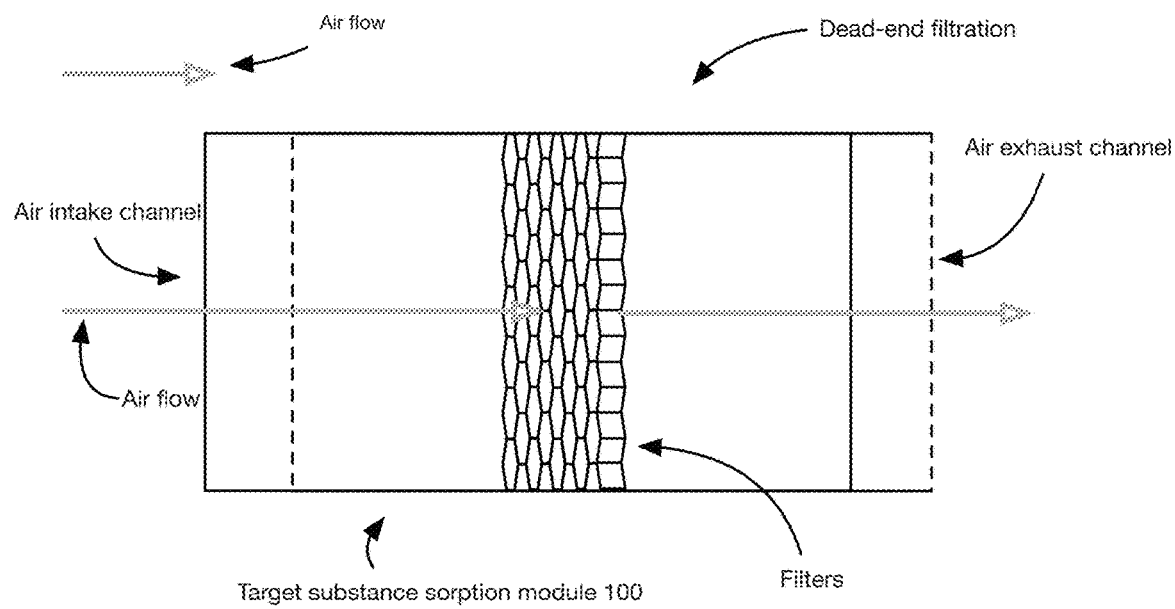

In an illustrative example, the system can include: a sorption module 100 fluidly connected to a working volume (e.g., an HVAC system, building interior, ambient environment, etc.) and configured to sorb a target substance (e.g., carbon dioxide, VOCs, etc.) from a working fluid of the working volume; a desorption system 300 connected to the sorption module 100 and configured to desorb the target substance from the sorbent; and a target substance container 400 fluidly connected to the sorption module 100 and configured to store the target substance removed from the sorption module 100. In examples, the sorption module 100 can include a sorbent arranged within a sorbent structure (e.g., in a packed bed, example shown in FIG. 9E, etc.). In examples, the sorbent structure can include microencapsulated carbon sorbents (MECS), which can include polymer (e.g., silicone) capsules filled with a sorbent (e.g., sodium carbonate), catalysts, water, and/or other compounds and sorbents. However, other sorbents and sorbent structures can be used.

Figure 2:
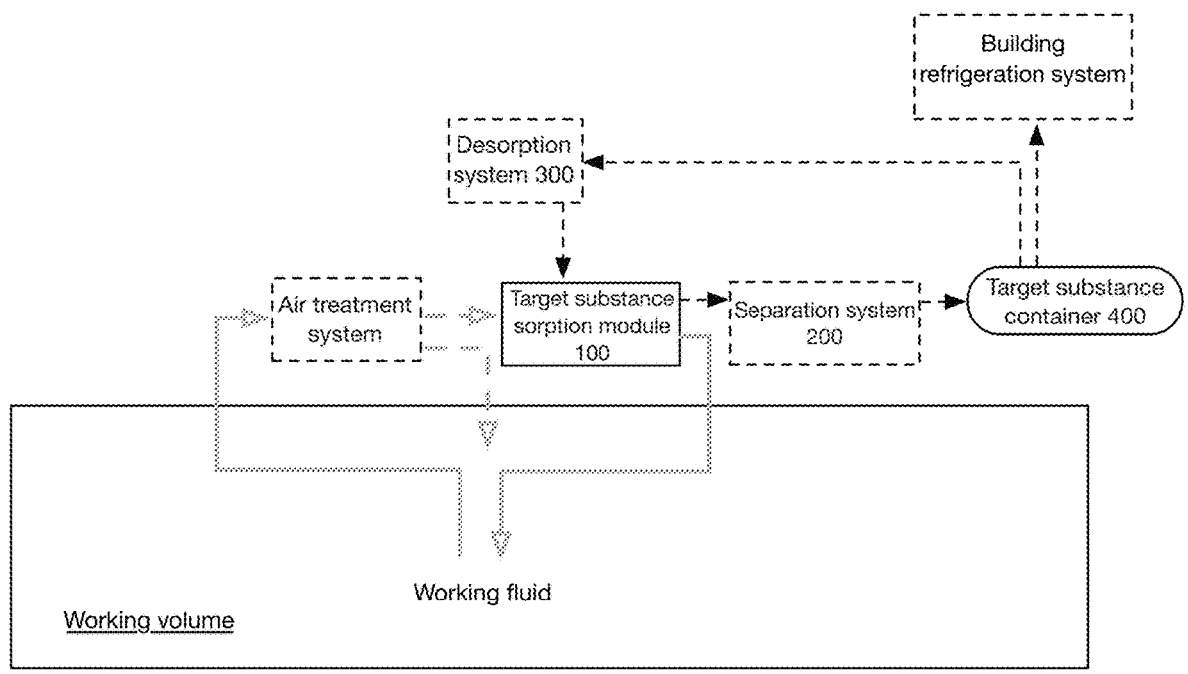
FIG. 2 is an illustrative example of a variant of the system installed in a building.
Figure 7:
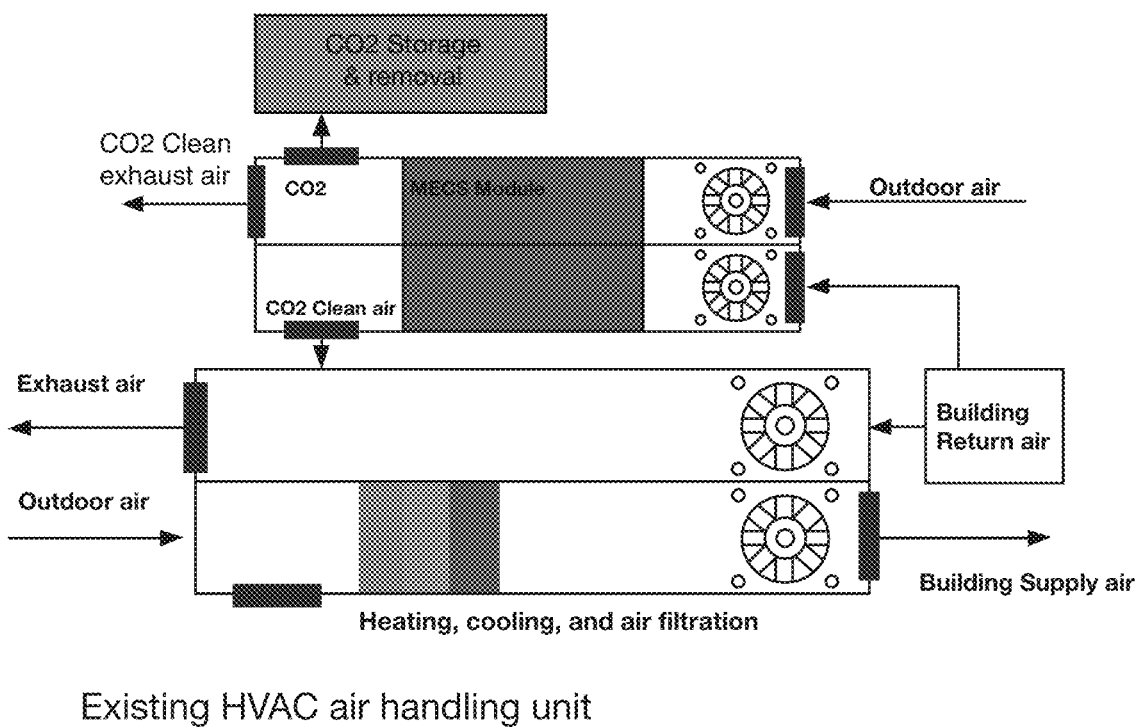
FIG. 7 is a schematic representation of a specific example of system components and air flow paths.

In operation, working fluid (e.g., air) from a working volume (e.g., an HVAC system) can flow through the sorbent structure within the sorption module 100, wherein the sorbent can absorb and/or adsorb a target substance (e.g., greenhouse gas, $CO_2$, etc.) from the working fluid (e.g., example shown in FIG. 7). Working fluid flowing out of the sorption module 100 can flow back into the working volume (e.g., as shown in FIG. 2), or to another endpoint. In variants, the system can regenerate the sorption module 100 upon occurrence of a desorption trigger (e.g., a target substance concentration difference between the air intake channel and air exhaust channel falling below a threshold difference; the target substance load within the sorbent exceeding a threshold; etc.). In examples, regenerating the sorption module 100 can include: closing fluid connections between the working volume and the sorption module 100; optionally rerouting the working fluid flow to another sorption module 100 or other fluid endpoint; optionally removing air from the sorption module 100 (e.g., by purging with captured target substance; by inducing negative pressure within the sorption module 100; etc.); desorbing the target substance from the sorbent using the desorption system 300 (e.g., by injecting hot water vapor into the sorption cavity, separating the target substance from water, pressurizing the sorption cavity, etc.); optionally pressurizing the target substance (e.g., in gaseous form) into a trans critical or supercritical state; flowing the desorbed target substance into a target substance container 400 for storage; and optionally cooling the sorption module 100 (e.g., such that the sorbent does not heat the working fluid when reconnected to the working volume). However, the sorption module 100 can be otherwise regenerated.

In specific examples, the desorption system 300 can leverage the desorbed target substance to prepare the sorption module 100 for sorption after desorption. For example, in variants, the sorption module 100 can be heated to desorb the target substance from the sorption material by injecting hot water vapor into the sorption cavity. The desorbed target substance (e.g., $CO_2$) can be stored in a compressed state (e.g., a trans critical state) and can be used as a refrigerant to cool the sorption module 100 from a desorption state back down to a sorption state. In an illustrative example, all or part of the compressed target substance can be provided to a refrigeration cycle within a heat pump used in the regeneration process (e.g., the same heat pump used to heat or desorb the target substance from the sorbent within a sorption module). In other examples, waste heat generated by compressing the desorbed target substance can be used to desorb the target substance from a sorption module 100.

However, the system can be otherwise configured.

2. Technical Advantages

Variants of the technology can confer one or more advantages over conventional technologies.

First, variants of the technology can use MECS as a sorbent structure, which can confer numerous benefits. For example, by encapsulating the sorbent within a polymer shell, MECS can increase the sorbing surface area (e.g., by creating gaseous, inter-capsule pockets) and increase the durability over conventional sorbents (e.g., the polymer shell can be solid). The MECs configuration can also ensure that an optimal mixture of sorbents and catalysts for sorbing are maintained, and prolong the lifespan of the sorbent (e.g., by physically protecting the sorbent). This can enable less-stable sorbents to be used. Additionally, encapsulation of the sorbent can reduce contamination of a working volume (e.g., indoor air). For example, the encapsulant of MECS can prevent the liquid sorbent from contaminating the air flowing through the sorption module 100.

Second, variants of the technology can be integrated into use cases where the waste heat, waste cooling, captured target substance, and/or other waste products can be reused by the system or by the integration environment. For example, the technology can be integrated into building air management systems, which enables the reuse of both waste heat and captured $CO_2$ from the carbon capture system to heat, cool, and/or power building systems, while building waste heat can similarly be used as a part of the sorbent regeneration process. Furthermore, system integration into these environments can enable more efficient environment operation. For example, since the system can lower recirculated $CO_2$ levels when integrated into a building heating, ventilation, and air conditioning (HVAC) system, the building management system (BMS) can achieve the same air management targets as a conventional HVAC system while using less unconditioned outside air, thereby decreasing the amount of overall energy needed to heat and/or cool the unconditioned air. Additionally, captured $CO_2$ can be used in other parts of the building system (e.g., as refrigerant).

Third, purging the sorption module 100 before desorption increases the purity of the captured target substance. Thus, the target substance has more predictable material qualities and is less likely to contain corrosive substances. Purer compositions of the target substance can also be used in a wider range of uses, specifically those for which purity is a key factor (e.g., for use in drink carbonation).

Fourth, a dynamically-controlled sorption module 100 can change system performance responsive to environmental changes and/or commands from a controller (e.g., a building management system). In a first example, two parallel sorption modules 100 can alternate modes such that at least one module is open to airflow at all times. In a second example, a sorption module 100 can selectively sorb air from indoor or outdoor air depending on building system needs and environmental factors in order to maximize sorbed $CO_2$. For example, the sorption module 100 can sorb $CO_2$ from outdoor air when the $CO_2$ concentration of outdoor air exceeds that of indoor air. In both example, dynamic control makes the sorption process more energy efficient.

Fifth, the combination of HVAC and carbon capture can reduce the need for mixed air in maintaining healthy indoor $CO_2$ concentration, reducing the need for pre-heated and/or cooling of outdoor. The desorption of $CO_2$ from indoor air can thus enable more efficient building designs.

However, further advantages can be provided by the system and method disclosed herein.

3. System

As shown in FIG. 1, variants of the system can include: a sorption module 100, a separation system 200, a desorption system 300, a target substance container 400, a cooling system 500, flow channels, sensors, a controller, and/or other components. The system functions to remove the target substance from a working fluid and optionally purify the removed target substance.

The working fluid can be liquid, gas, and/or any other suitable fluid. The working fluid can be air, exhaust, flue gas, and/or any other suitable fluid. References to "air" hereinafter can be understood to also apply to other working fluids. The working fluid can be conditioned (e.g., pressurized, heated, cooled, etc.) or unconditioned.

The working fluid is preferably from a working volume but can be from any other suitable source. The working volume can be: the interior of a building, the ambient environment (e.g., ambient air, outside air), an exhaust plenum, and/or any other suitable working volume. Working fluid can be actively fed from the working volume into the system (e.g., using a blower, vacuum, pump, etc.), be passively exposed to the system, and/or otherwise interact with the system. The working volume can be changed at any suitable time using flow channels.

The target substance is preferably a pollutant (e.g., a greenhouse gas, VOC, etc.), but can additionally or alternatively be any other suitable target substance. Examples of the target substance can be $CO_2$, CO, methane, $N_2O$, $NH_3$, chlorine, methyl chloride, $H_2O$ (e.g., water vapor, liquid water, etc.), VOCs (e.g., formaldehyde, methane, ammonia, ammonium, $ClO_x$, TCE, MTBE, terpenoids, benzene, toluene, limonene, etc.), SOX, NOX (e.g., $NO_2$), and/or any other suitable target substance. The target substance can preferably be mixed within the working fluid (e.g., has the same physical state as the working fluid), but can alternatively be separate from the working fluid (e.g., in a different physical state from the working fluid). The desorbed target substance can be desorbed as and/or stored as: gas, liquid, in a trans critical state (e.g., between gas and liquid), a supercritical state, and/or in any other suitable physical state. Alternatively, a target substance can be sorbed permanently and discarded with the sorbent. In a specific example, ammonia can be captured by acidic sorbents and gas permeable membranes.

3.1 Sorption Module 100

The sorption module 100 (e.g., an air treatment module) can include a sorbent, a sorbent structure, a sorption cavity, an air intake channel, an air exhaust channel, a target substance exhaust channel, a desorption system 300, and/or a purging system 700.

The sorption module 100 can remove the target substance from the air at a predetermined rate, at a rate dependent on the target substance concentration in the working fluid, and/or at any other suitable rate. In examples, a sorption module 100 can remove target substance from air at a rate of 5 tons/year, 10 tons/year, 20 tons/year, 40 tons/year, 60 tons/year, 80 tons/year, 200 tons/year, 1000 tons/year, 5,000 tons/year, 10,000 tons/year, 50,000 tons/year, within any open or closed range bounded by any of the aforementioned values, less than 5 tons/year, higher than 50,000 tons/year, and/or any other suitable range.

The sorption module 100 can operate with a voltage of 80 volts, 100 volts, 150 volts, 200 volts, 240 volts, 277 volts, 480 volts, 600 volts, or within any open or closed range bounded by any of the aforementioned values and/or any other suitable range.

Figure 6A:
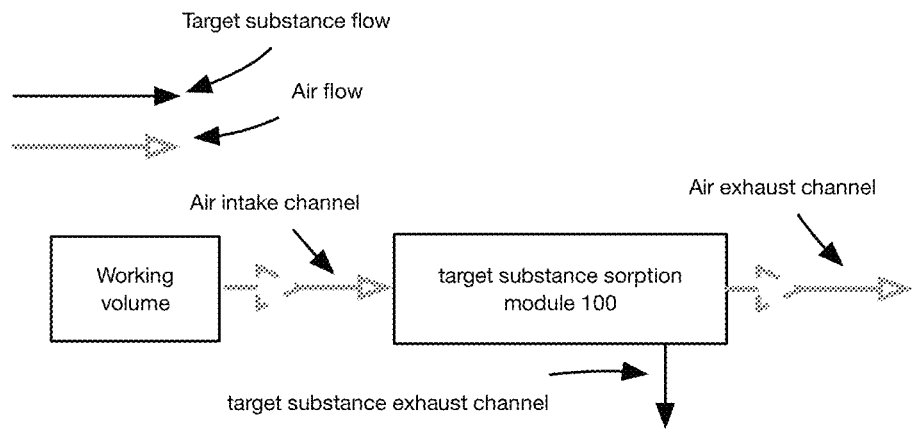
FIGS. 6A-6D are schematic representations of different airflow path variants through the system.
Figure 6B:
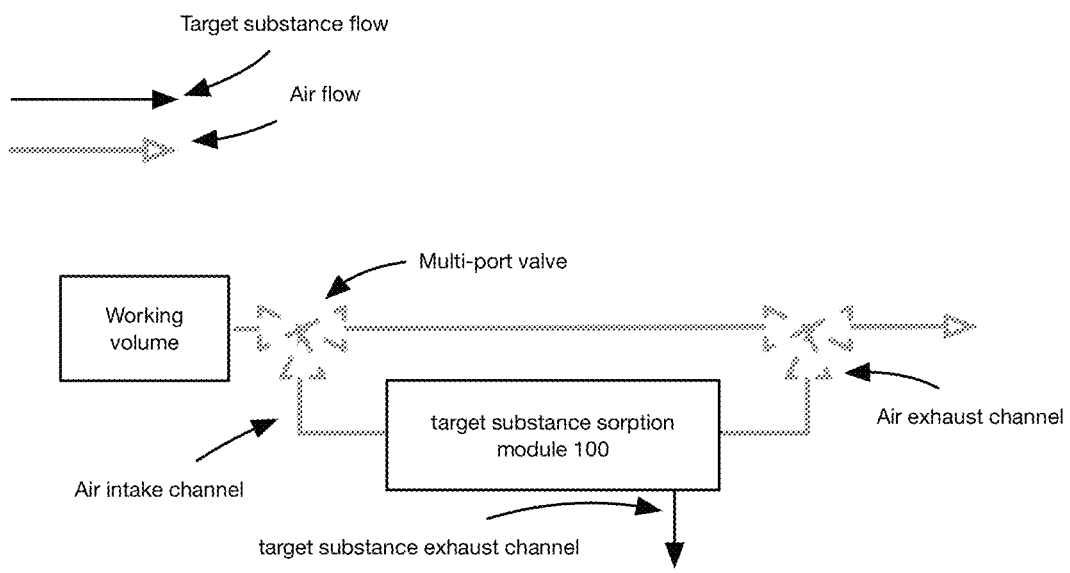
Figure 6C:
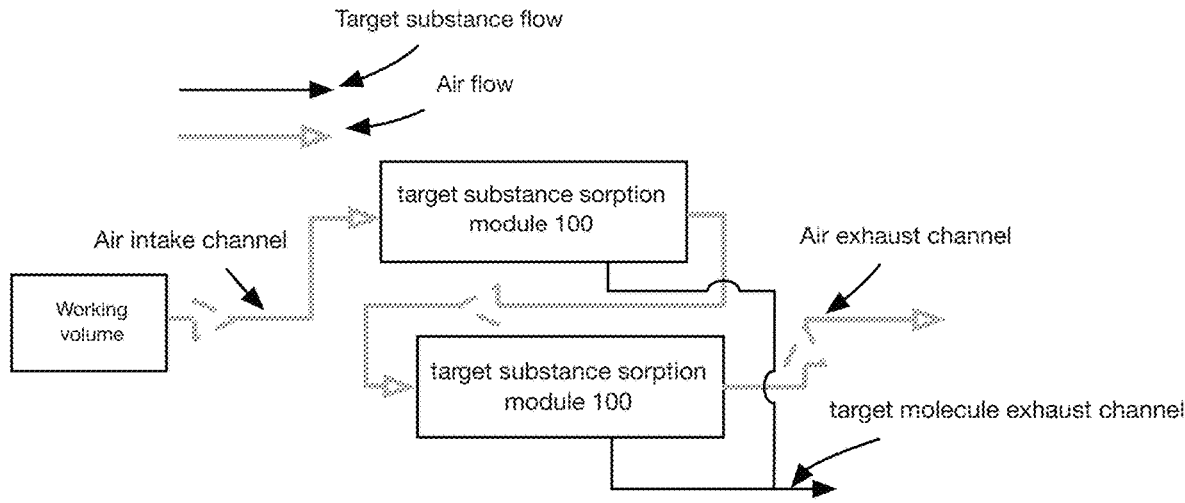
Figure 6D:
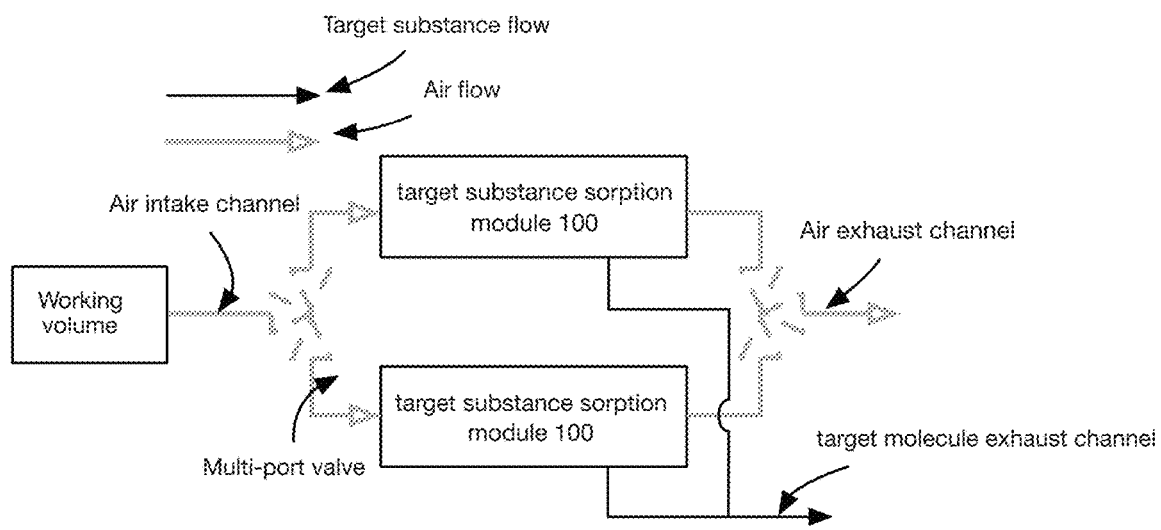

The system can include one or more sorption modules 100, connected in series, in parallel, or a combination thereof. Each sorption module 100 can include one or more cavities (e.g., fluidly isolated cavities, fluidly interconnected cavities, independently operating cavities, etc.; examples shown in FIG. 6C and FIG. 6D). Different sorption modules 100 and/or cavities thereof can operate independently or in coordination (e.g., alternate, in a predetermined order, in offset modes, etc.).

In a first variant, the system includes one sorption module 100 operable in multiple modes.

In a second variant, the system includes one sorption module 100 which includes multiple (e.g., two, greater than two, etc.) sorption cavities. In this variant, the sorption cavities can synchronously or asynchronously transition between the same modes at the same time and/or at different times. In an example, a first sorption cavity sorbs the target substance from a working fluid while the other sorption cavity desorbs the target substance from a different working fluid.

In a third variant, the system includes at least two sorption modules 100 in parallel operating in alternating or offset cycles of modes (e.g., sorption, desorption, etc.). In an example, a second sorption module can operate in the desorption mode while a first sorption module can operate in the sorption mode. Optionally, the two sorption modules can be thermally connected and use heat generated by a cooling system of one sorption module to desorb the target substance from the other sorption module, which can confer, for instance, benefits in efficiency and/or re-use of energy.

In a fourth variant, the system includes at least two non-parallel sorption modules 100 (e.g., modules in series or branching off of a main HVAC flow path).

However, the system can include any suitable number of sorption modules 100 each operating in any suitable pattern relative to each other. In variants with multiple sorption modules, different sorption modules can optionally share any suitable subset of components with each other (e.g., a desorption system can be shared between modules).

The sorption module 100 can be integrated into an air system. In a first variant, the sorption module 100 can be in an HVAC system (e.g., in HVAC intake, pre-treatment, post-treatment, etc., where treatment can be heating, cooling, dehumidification, and/or another process). In this variant, the sorption module 100 can be in series with airflow, parallel with airflow (e.g., in a branch duct), within the airflow (e.g., wherein air flows around the sorption module), and/or in any other suitable position. In a second variant, the sorption module 100 can be attached to an indoor space directly (e.g., mounted to a wall, beneath a floor vent, included in artwork, etc.) (e.g., example shown in FIG. 2). In a third variant, the sorption module 100 can be in an exhaust system (e.g., a ventilation shaft, an emissions outlet, an exhaust stack, and/or a chimney). However, the sorption module 100 can be integrated into any other suitable environment.

3.1.1 Sorbent

The sorbent functions to draw (e.g., adsorb, absorb, etc.) the target substance out of air and reversibly retain the target substance (e.g., through sorption). The sorbent can absorb and/or adsorb, bind (e.g., using a covalent bond, ionic bond, hydrogen bond, van der Waals forces, etc.), react with, and/or otherwise interact with the target substance. Sorbents can be salt solutions, amine-based sorbents, solid sorbents, solid sorbents in solution, hydroxide-based sorbents, ionic liquids, and/or other types of sorbents. Sorbents may be mixtures of amines or inorganic bases and carbonates, ammonia, acidic sorbents (e.g., sulfuric and phosphoric acids), ionic liquids (e.g., functioning as a catalyst for target substance absorption; functioning as the sorbent; etc.), carborane sorbents, sodium yttrium sorbents, alkaline solid-liquid slurries, and/or any other suitable sorbent. Examples of sorbents include: monoethanolamine, diethanolamine, sodium hydroxide, sodium carbonate, potassium hydroxide, potassium carbonate, ammonium carbonate, ammonium bicarbonate, ammonium hydroxide, calcium carbonate, lithium carbonate, amino acid salts, activated carbon (e.g., doped, enhanced, solid sorbents, etc.), and other suitable sorbent types. In a variant, the sorbent can optionally contain enzymes, catalysts, and/or other reagents to enhance the rate of $CO_2$ hydration, disinfect the target substance, disinfect the air, increase the rate of target substance uptake, and/or otherwise change sorbent performance. The sorbent can be solid, liquid (e.g., an electrolyte solution), a mixture thereof, and/or in any other suitable physical phase. The sorbent can sorb one or more substances from the air. The sorbent can be regeneratable or non-regeneratable. In a first variant, multiple concurrent sorbent chemistries can be used. In a second variant, different sorbents can sequentially sorb the target substance from the air. In an example, absorbing sorbents (e.g., MECS) can be used instead of adsorbing sorbents, which prevents the target substance from desorbing back into the working volume when the sorbent is saturated.

The sorbent can reduce the concentration of the target substance from and/or to 100 PPM, 200 PPM, 400 PPM, 800 PPM, 1000 PPM, 1500 PPM, 2000 PPM, 3000 PPM, 6000 PPM, 15,000 PPM, 30,000 PPM, 50,000 PPM, 100,000 PPM of the air, within any open or closed range bounded by any of the aforementioned values, at concentrations below 100 PPM, at concentrations above 100,000 PPM and/or at any other suitable range.

However, the sorbent can be otherwise configured.

3.1.2 Sorbent Structure

The sorbent structure functions to facilitate contact between the sorbent and the air. The sorbent structure can additionally retain the sorbent. The sorbent structure can be made of sorbent, can be made of a material permanently or temporarily containing sorbent, and/or can be made of another suitable material. In a variant, the sorbent structure can include other sorbent structures within it. Each sorption module 100 can include one or more sorbent structures (e.g., arranged in parallel, in series, etc.).

Figure 8:
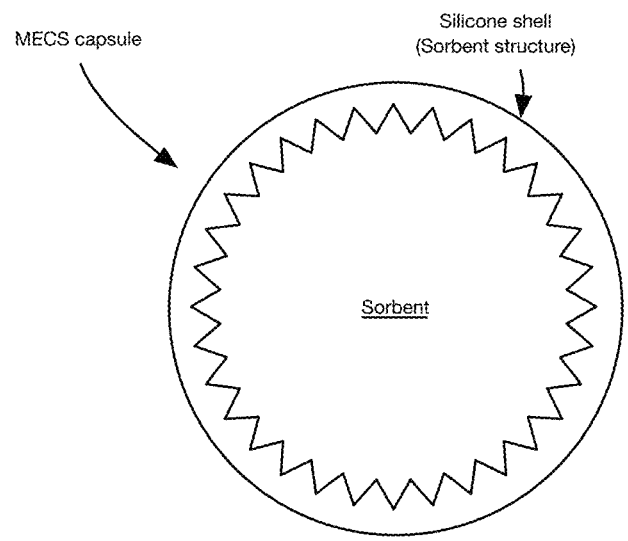
FIG. 8 is a cross section of an illustrative example of a MECS sorbent structure.

In a first variant, the sorbent structure is a sorbent capsule (e.g., MECS, micro encapsulated CO2 sorbent) or set of sorbent capsules (e.g., as shown in FIG. 8). A sorbent capsule can include sorbent within a shell or be otherwise configured. The shell can be made of a polymer, glass, and/or any other suitable material. Examples of polymers that can be used for the shell include: silicone, Polytetrafluoroethylene (PTFE), Polyether ether ketone (PEEK), High Density Polyethylene (HDPE), and/or any other suitable polymer. A set of capsules can be equally sized or can vary in size. In an example of this variant, sorbent capsules can include: a durable polymer shell, sodium carbonate, a catalyst, and water. A sorbent capsule diameter can be 25 microns, 50 microns, 100 microns, 200 microns, 400 microns, 600 microns, 800 microns, 1000 microns, within any open or closed range bounded by any of the aforementioned values, and/or any other suitable range. A sorbent capsule can be spherical, pellet-shaped, ellipsoid, square, spheroid, cylindrical, and/or any other suitable shape. Sorbent capsules can be arranged in a regular or irregular pattern. Sorbent capsules can be whole or broken-up. In a specific example, sorbent capsules can be any of the structures disclosed in U.S. application Ser. No. 13/312,418 filed 6 Dec. 2011; U.S. application Ser. No. 13/661,900 filed 26 Oct. 2012; U.S. application Ser. No. 15/928,522 filed Mar. 22, 2018; and/or U.S. application Ser. No. 16/920,083 filed Jul. 2, 2020; each of which incorporated herein in its entirety by this reference. These sorbent structures can, in turn, be retained within a higher-order sorbent structure (e.g., in a fluidized bed, in a packed bed, in an annulus extending coaxially with working fluid flow, in a filter, etc.), or be otherwise retained. However, the sorbent capsules can be otherwise constructed.

In a first sorbent capsule embodiment, the sorbent capsules are in a higher-order sorbent structure arranged around the flow path of air within the target sorption module (e.g., along the perimeter of an HVAC duct and/or the sorption cavity). In this variant, the sorption cavity cross sectional area can be decreased or not changed by the presence of sorbent capsules. In this variant, the higher-order sorbent structure can be a circular (e.g., an annulus), rectangular, and/or any other suitable shape (e.g., example shown in FIG. 9F). In a second MECS embodiment, the MECS capsules can be arranged across an entire cross section of a sorption cavity (e.g., embedded in a filter or otherwise retained). In a third sorbent capsule embodiment, sorbent capsules can be retained in a set of planar panels parallel to the direction of flow. However, the sorbent capsules can be arranged in any other suitable manner. In embodiments where sorbent capsules are arranged across the sorption cavity cross-section (e.g., where sorbent capsules are arranged perpendicular to the flow path), the ratio of cross-sectional width to depth (e.g., the straight-line distance between the most upstream sorbent capsule and most downstream sorbent capsule) can be 1:10, 1:5, 1:2, 1:1, 2:1, 5:1, 10:1, 50:1, within any open or closed range bounded by any of the aforementioned values, and/or can be within any other suitable range of ratios. Sorbent capsules can be arranged in a regular or non-regular pattern.

In a second variant, the sorbent structure is a sorbent-doped fiber filter. The sorbent doped fiber filter can be impregnated with liquid, solid sorbent, or a combination. Air can pass through, around, and/or across the filter surface. The surface of the filter can be oriented in any direction relative to the sorption module 100 and air flow path. In an example of this variant, the filter can be a cross-flow filter, wherein a broad surface of the filter can be arranged parallel to the direction of flow (e.g., example shown in FIG. 9B). In a second example of this variant, the filter is a dead-end filter, wherein a broad surface of the filter can be perpendicular to the direction of flow (e.g., example shown in FIG. 9C). In this example, the filter can cover the entire sorption module 100 cross section or part of the sorption module 100 cross section.

In a third variant, the sorbent structure is a liquid suspending a liquid-suspended sorbent. In an example of this variant, air can bubble through the liquid. All or part of the air passing through the sorption module 100 can bubble through the liquid.

In a fourth variant, the sorbent structure can include a cell structure and/or mesh (e.g., a honeycomb, grid, etc.) containing sorbent and/or another sorbent structure (e.g., MECS).

In a fifth variant, working fluid can bubble through a liquid. This liquid can be in contact with a gas permeable membrane to allow transit of the target substance. A sorbent, catalyst, and/or other transit enhancers can be present to facilitate and/or increase transit through the gas permeable membrane.

In a sixth variant, the sorbent structure is a fluid (e.g., a gas, a liquid, a fluidized solid, etc.) suspending a sorbent. In examples, the sorbent can be a gas, liquid, and/or a fluidized solid. However, a fluid sorbent structure can otherwise be configured.

However, another sorbent structure can be used.

Air can contact the sorbent in a variety of ways. In a first variant, air can pass through the sorbent structure. In a second variant, air can pass over the surface of the sorbent structure. In a third variant, air shares space with and contacts the sorbent structure. In a fourth variant, the sorbent and/or sorbent structure can be poured, shaken, and/or otherwise moved over, under, and/or through air. In a fifth variant, airflow moves the sorbent structure itself (e.g., in a fluidized bed, etc.). Air can contact the sorbent while moving vertically, horizontally, and/or in any other suitable direction relative to gravity, a filter, sorbent capsules, the sorption module, and/or any other suitable system component.

3.1.3 Sorption Cavity

The sorption module 100 can include one or more sorption cavities. The sorption cavity can function to retain the sorbent structure and facilitate the flow of air across the sorbent structure. The sorption module 100 can contain at least one sorption cavity. The sorption cavity or cavities can be fluidly connected to an air intake channel, an air exhaust channel, and/or a purging channel. The sorption cavity can be fluidly connected to a compressor (e.g., a pump), a desorption system 300, a cooling system 500, a target substance container 400, long-term storage, a separation system 200, and/or any other suitable system component.

The sorption module 100 can have one or more form factors. In examples, the sorption module 100 can have a: fluidized bed (e.g., one stage, multistage, transient reactor), fixed bed (e.g., structured fixed bed), moving bed (e.g., rotating bed), coaxial flow (e.g., wherein the working fluid flows coaxially over a broad face of the sorption material or structure), and/or any other suitable configuration of a sorbent or sorbent structure within one or more sorption cavities. In a first variant, the sorption module 100 includes a tubular sorption cavity (e.g., with a round, ovate, square, rectangular, and/or any other suitable cross-sectional shape) enclosing the sorbent material. In this variant, the air flows in through the air intake channel and out through the air exhaust channel (e.g., example shown in FIG. 6A). In a first example, the sorption module 100 contains a sorbent structure covering the entire cross-sectional area of the sorption cavity within the sorption module 100. In a second example, the sorption module 100 contains a sorbent structure covering part of the cross-sectional area of the sorption cavity. In a third example, the sorption module 100 contains a sorbent structure along one or more walls of the sorption cavity (e.g., adjacent walls, opposing walls, longitudinal walls, lateral walls, etc.).

In a second variant, the sorption module 100 includes a tank with an air intake channel, the air intake channel also connected to a tank beneath an air exhaust channel. In this variant, the sorption module 100 can contain a fluidized sorbent bed, fluidized sorbent, and/or another sorbent structure (e.g., example shown in FIG. 9A). Air can "bubble up" through the sorbent structure, desorbing as the air climbs.

Figure 9D:
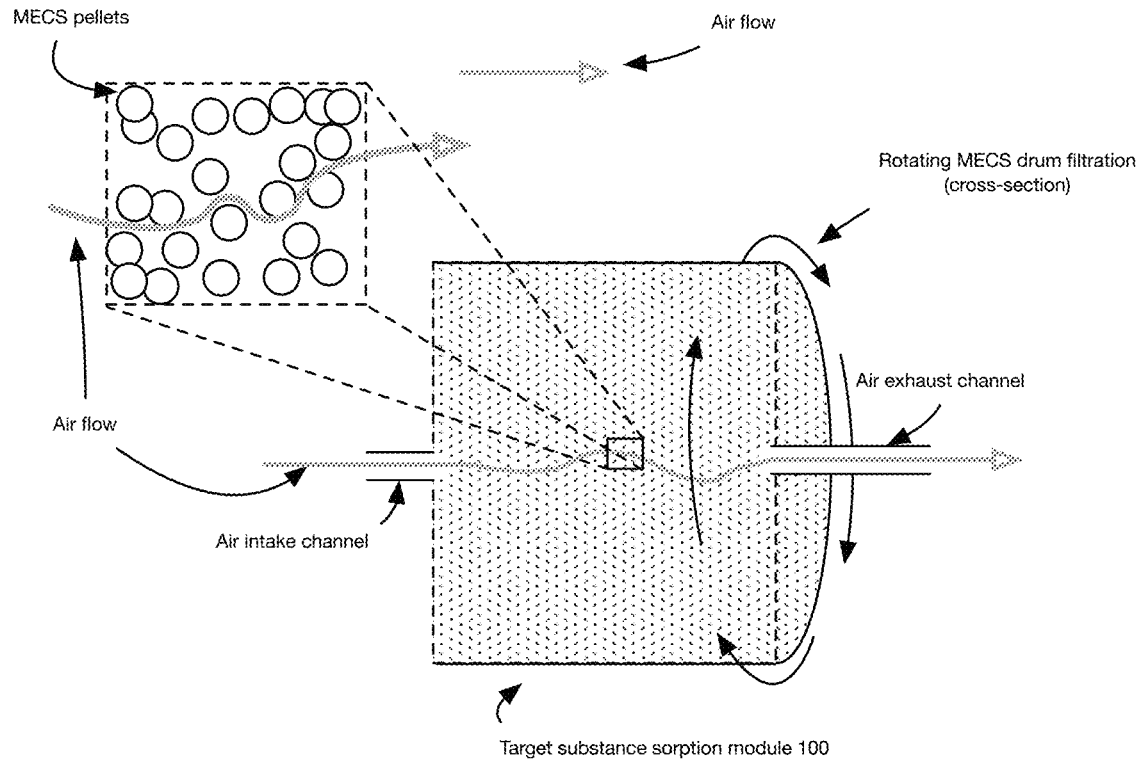
Figure 9E:
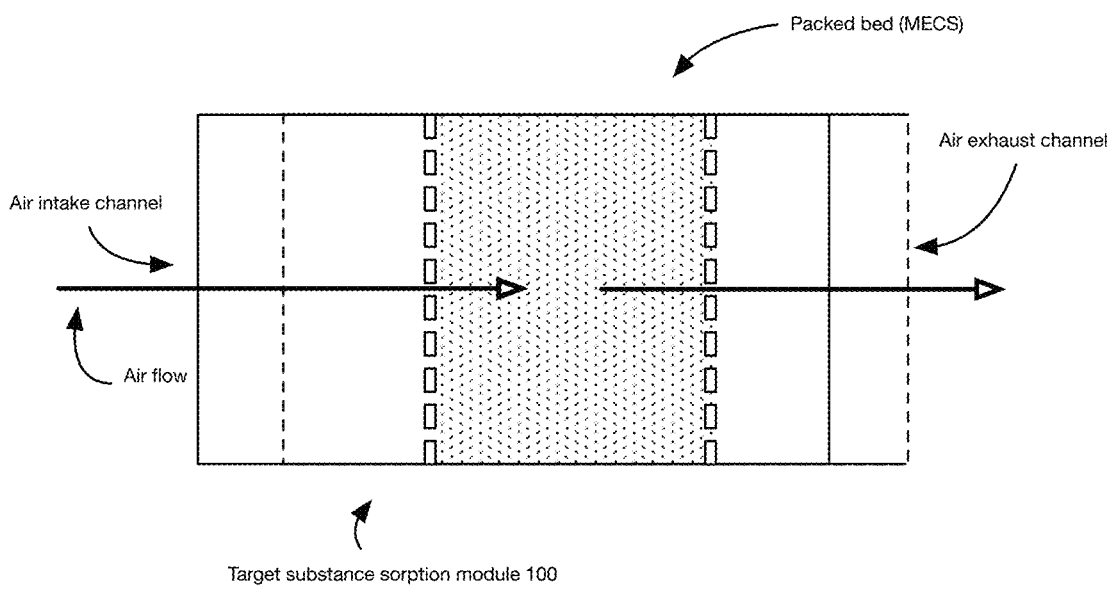
Figure 9F:
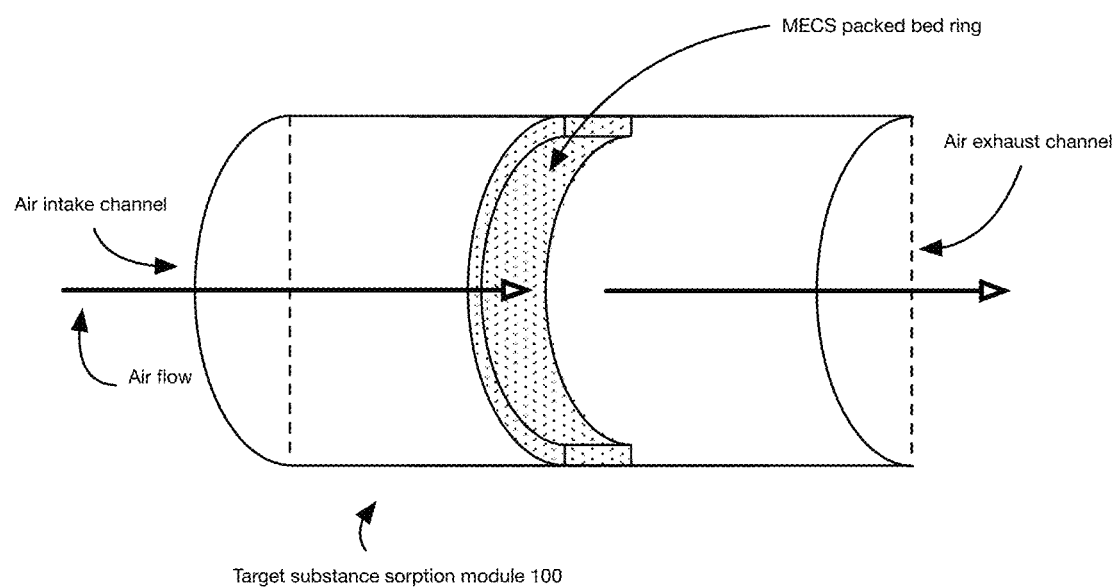

In a third variant, the sorption module 100 includes a rotating drum containing sorbent and/or a sorbent structure (e.g., example shown in FIG. 9D). In this variant, the air intake channel and air exhaust channel can be coaxial with drum rotation.

However, the sorption module 100 and/or sorption cavity can have any other suitable configuration.

3.1.4 Sorption Modes

The sorption module 100 can be operable between a sorption mode (e.g., S100 and S200), a desorption mode (e.g., any suitable subset of S300-S700), an optional recharge mode, and/or another suitable set of modes. The desorption mode can include a purging mode (e.g., S300), a regeneration mode (e.g., S400), a separation mode (e.g., S500), a target substance removal mode (e.g., removing the target substance from the sorption cavity after desorption using a compressor, vacuum pump, and/or volume collapse), a compression mode (e.g., S600), a cooling mode (e.g., S700), and/or any other suitable set of modes.

The sorption mode functions to remove the target substance from the air. The sorption mode can include target substance collection (e.g., within a sorbent etc.) as air contacts (e.g., flows across, flows through, touches) a sorbent structure. The desorption mode functions to remove the sorbed target substance from the sorbent using a desorption system 300.

The optional recharge mode functions to prepare the sorbent for sorption (e.g., in a future/repeated instance of a sorption process), which can include increasing or decreasing pressure, temperature, the magnitude of an electric charge, and/or adjusting another parameter of the sorbent material to a set of target operation parameters. In a specific example, for a sorbent which desorbs a target substance at high temperatures, the recharge mode can include cooling the sorbent with the cooling unit 350 (and/or the cooling system 500). However, the recharge mode can include any other suitable set of processes.

The optional separation mode functions to separate desorbed target substance from other material which the target substance is mixed with. For example, in a variant where the heating element uses steam to heat the MECS capsules, the separation mode can function to separate water (e.g., liquid or water vapor) from the target substance. However, the separation mode can use any other suitable set of processes.

However, the sorption module 100 can operate between any suitable set of modes.

3.1.5 Blower

The sorption module 100 can optionally contain a blower. The blower functions to overcome the pressure drop caused by the sorbent (thereby pulling air into the intake channel), can force working fluid flow through the sorption module 100, can manage airflow through the system, can modify the rate of sorption, and/or can be otherwise used. The blower can be arranged within the sorption module 100 or can be outside of the sorption module 100. The blower can be arranged within the sorption cavity, the air intake channel, air exhaust channel, and/or any other suitable flow channel. In variants, the system can monitor the pressure drop between the air intake channel and the air exhaust channel and dynamically adjust blower operation to maintain a pressure drop within a threshold range (e.g., as close to 0 as possible). Examples of blowers that can be used include fans, blowers, natural ventilation (e.g., wind), an air pump, and/or other types of blowers. The system can additionally or alternatively include passive flow mechanisms (e.g., increasing or reducing cross-sectional flow area, increasing or reducing airflow volume using plenums, using venturi tubes, etc.) to adjust flow parameters.

3.1.6 Flow Channels

The sorption module 100 can also include flow channels, which facilitate and/or control fluid flow between elements of the system. Flow channels can connect any system component to any other system component or to indoor space and outdoor air. Flow channels can facilitate flow of air (e.g., working fluid), purged substances, the target substance, water, and/or other fluids. Flow channels can include one or more active or passive valves. Valves can include dampers, louvers, and/or other types of valves (e.g., solenoid valves, check valves, butterfly valves, ball valves, needle valve, diaphragm valve, etc.). Flow channels can include or exclude sensors. Flow channels can lead to, lead from, and/or bypass a sorption module 100; but flow channels can be alternatively connected to other system elements. In a first variant, at least one flow channel through a sorption module is always open across a set of sorption modules. In a second variant, flow channels through all sorption modules in a set of sorption modules are closed at the same time. In a third variant, flow channels through all sorption modules in a set of sorption modules are open at the same time. Flow channels can include an air intake channel, an air exhaust channel, a purging channel, a target substance exhaust channel, and/or any other suitable type of channel. The system can include zero or at least one of each type of channel.

The air intake channel functions to facilitate airflow into the sorption module 100 from the working volume. The air exhaust channel functions to facilitate airflow out of the sorption module 100. The system can include any suitable number and/or arrangement of air intake channels and/or air exhaust channels. In a first variant, the air exhaust channel and air intake channel are the same channel. In a second variant, the air exhaust channel and the air intake channel alternate roles. The air intake channel can intake all air from an HVAC duct/plenum or can alternatively intake a percentage of air (e.g., 1%, 2%, 5%, 10%, 30%, 50%, 80%, within any open or closed range bounded by any of the aforementioned values, below 1%, above 80%, and/or any other suitable range (e.g., example shown in FIG. 6B). Air channels (e.g., the air intake channel and/or air exhaust channel) can be fluidly connected to any suitable system component and/or working volume. In a first variant, a single air channel connects a building plenum to the sorption cavity. In a second variant, a single air channel connects ambient air to the sorption cavity. In a third variant, the system includes multiple air channels connected to different working volumes (e.g., including a building plenum, separate rooms, ambient air, and/or an exhaust channel of a different sorption module 100). In a fourth variant, the intake channel can be fluidly connected to outdoor air. However, the intake channel can be otherwise fluidly connected to a working volume.

The air channels (e.g., the air intake channel and/or the air exhaust channel) can operate between an indoor sorption mode, wherein the working volume is the interior of a building, an outdoor sorption mode, wherein the working volume is the outdoor air, a process-specific mode, wherein the working volume is the exhaust of a target substance-generating process, a room-specific mode, wherein the working volume is a specific room or set of rooms, a mixed mode, wherein air channels are open to both the interior of a building and outdoor air, and/or another suitable mode. The modes can be temporally overlapping (e.g., the system can draw in air from the outside and inside concurrently) and/or temporally non-overlapping. The sorption module 100 can also operate between the aforementioned modes (e.g., wherein the controller instructs the air channels to operate in the corresponding mode). In variants, an air channel can be selectively connectable to different working volumes using a flow control mechanism (e.g., louvers, dampers, registers, a venturi valve, backdraft dampers, a variable air volume system, etc.). Thus, in this variant, the flow control mechanism can control operation modes based on differential occupancy between rooms, temperature, target substance concentration in different rooms, target substance concentration in the building, relative target concentration between rooms and/or the outdoor air, a schedule, the time of day, building management system controls, and/or other suitable factors.

However, the air intake channel and air exhaust channel can be otherwise configured.

The optional purging channel functions to facilitate airflow out of the sorption module 100. In a variant, the purging channel is the same channel as or is fluidly connected to the air exhaust channel. In a second variant, the purging channel is the same channel as or is fluidly connected to the air intake channel. In a third variant, the purging channel is the same channel as the target substance exhaust channel. In a fourth variant, the purging channel is an independent channel. The purging channel can fluidly connect the sorption cavity to a compressor, outdoor air, indoor air, an HVAC plenum, a different sorption module 100, and/or any other suitable working volume. However, the purging channel can be otherwise configured.

The target substance exhaust channel functions to facilitate air flow out of the sorption module 100. The target substance exhaust channel can connect to a compressor, a refrigeration cycle, a CO2 container, a cooling system 500, and/or any other system component. The target substance exhaust channel can include an active valve (e.g., solenoid valve) or passive valve (e.g., check valve). The valve within the target substance exhaust channel can open when cavity temperature reaches a threshold, on a timed schedule, when the concentration of the target substance within the sorption cavity reaches a threshold, when sorption cavity pressure reaches a threshold, responsive to a command from a controller (e.g., a building management system), when the sorption module 100 switches modes from a regeneration mode and/or desorption mode to a target substance removal mode, cand/or responsive to any other suitable condition. However, the target substance exhaust channel can be alternatively configured.

The air intake channel, air exhaust channel, purging channel, and/or target substance exhaust channel can include air treatment systems, valves, sensors, and/or other suitable system components. However, the flow channels can be otherwise configured.

3.2 Purging System

The system can optionally include a purging system 700 that functions to evacuate air from the sorption module 100 prior to desorption. Purging the module facilitates isolating the target substance in purer form (e.g., the substance is not mixed with lingering air). The purging system 700 can purge the air into: the ambient environment, the working volume, a secondary sorption module 100, a purging volume, and/or any other suitable fluid sink.

The purging system 700 can include: a purging volume, a purging mechanism, and/or any other suitable set of components. The purging volume can draw air out of the sorption module 100 or can serve as the source for a displacement gas (e.g., previously captured target substance, inert gas, water vapor, etc.). The purging volume can be a vacuum chamber, a pressurized volume containing the target substance, and/or another suitable volume.

The purging mechanism functions to purge the sorption module 100. In a first variant, the purging mechanism can be a vacuum (e.g., creating a vacuum in the sorption module 100 or a purging cavity to draw air out). In a first example, a vacuum can be created in the sorption cavity directly (e.g., using the compressor, using a vacuum pump, etc.). In a second example, a vacuum can be created in the purging volume and a valve connecting the purging volume to the sorption cavity can be opened (e.g., a valve in the purging channel and/or another suitable channel), causing airflow out of the sorption cavity and into the purging chamber. The compressor generating the vacuum can be the same compressor compressing captured target substance or can be a different compressor. However, a vacuum can be otherwise generated.

In a second variant, the purging mechanism can be displacement. In this variant, a purging gas can be forced into the sorption cavity, forcing the air within the sorption cavity to evacuate via the purging channel. The purging gas can be the same substance as the target substance, can be water vapor, and/or can be any other suitable gas or substance. The purging gas can be forced into the sorption cavity by a pump and/or by a pressure differential between the sorption cavity and a purging chamber. However, the purging gas can be otherwise forced into the sorption cavity.

In a third variant, the purging mechanism can be volume collapse. In this variant, the volume of the sorption cavity changes, forcing air out of the sorption cavity through the purging channel. In a first example, a wall of the sorption module moves toward the opposite end of the sorption module. In a second example, the sorption module is pliant (e.g., a bag) which is compressed or crushed from the outside or inside (e.g., a vacuum). In a specific example, pressurization of a gas (e.g., target substance) on the opposite side of the boundary defining the sorption cavity can cause the volume collapse of the sorption cavity. In a second specific example, two sorption cavities can be on either side of a moving surface separating the two sorption cavities. In this specific example, the sorption cavities can operate in opposing modes. However, the volume collapse can be otherwise generated.

In a fourth variant, the system can include no purging mechanism. In this variant, purification can be performed offsite or outside of the sorption module 100.

In a fifth variant, the target substance can be not purified.

In a sixth variant, the system can selectively purge or not purge the sorption cavity depending on a control from a building management system, the composition (e.g., purity) of gas within the sorption cavity, energy availability, and/or other suitable factors. However, any of the aforementioned variants can be combined or the purging system 700 can be otherwise configured.

3.3 Desorption System

The system can include a desorption system 300 which functions to desorb the target substance from the sorbent. The desorption system 300 can include a heating system 340, cooling unit 350, compressors, sensors, and/or other components. In a first variant, the desorption system 300 can include a compressor and/or pump and/or connection to a vacuum chamber which drives pressure swing desorption, whereby the system is rapidly depressurized to release the target substance (e.g., CO2) from the sorbent.

Figure 3:
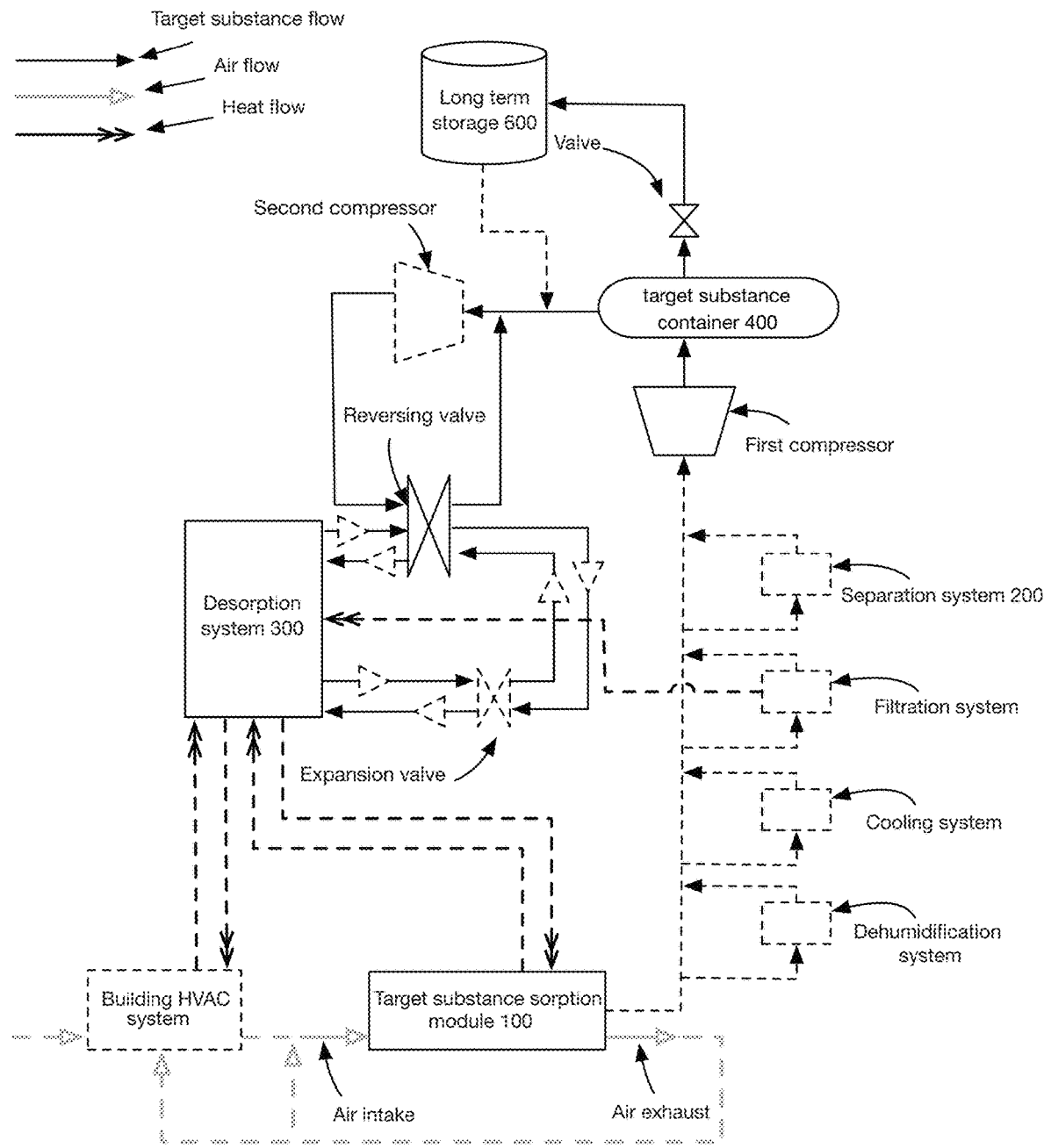
FIG. 3 is a schematic representation of an illustrative example of system components.

In a second variant, the desorption system 300 can include a heating system 340 which functions to heat sorbent during regeneration and optionally store water. The heating system 340 can include a heating fluid chamber (e.g., a chamber which retains and heats fluid). The heating system 340 can be thermally and/or fluidly connected to any suitable heating targets (e.g., a component and/or object which the heating system 340 is configured to heat). Examples of heating targets include the sorption module 100, heating fluid chamber, sorbent structure, sorbent, desorbed target substance and/or any other suitable portion of the sorption module 100 or system. The heating system 340 can heat sorbent from a lower temperature to a higher temperature, wherein the higher temperature is equal to or above a desorption temperature. The desorption temperature and/or higher temperature can be 40° C., 50° C., 70° ° C., 80° C., 100° ° C., 120° C., 130° C., 150° C., 200° C., be within any open or closed range bounded by any of the aforementioned values, be below 40°, be above 200° ° C., and/or be within any other suitable range. A heating system 340 can heat the sorbent within one sorption module 100 or multiple sorption modules 100. In a first embodiment of the second variant, the heating system 340 can be integrated with a cooling system 500 (e.g., as described below) and/or cooling unit 350 (e.g., as part of a refrigeration cycle in a heat pump, as shown in FIG. 1 and FIG. 3) in an integrated unit. In this variant, the integrated unit can be supplemented by additional heating, cooling, and power from other sources. The integrated unit can use the captured target substance (e.g., CO2) as a refrigerant, but any other suitable refrigerant can alternatively be used. In an example, the refrigerant includes compressed supercritical CO2 from a compressor (e.g., at 70 bar, 76 bar, 80 bar, 90 bar, 100 bar, within any open or closed range bounded by any of the aforementioned values, and/or any other suitable range). In another embodiment, a compressor within and/or attached to the integrated unit can further compress the refrigerant to 95 bar, 100 bar, 110 bar, 150 bar, 200 bar, 300 bar, 400 bar, within any open or closed range bounded by any of the aforementioned values, to below 95 bar, above 400 bar, and/or any other suitable range.

The heating system 340 can include a heat pump, resistive heater, chemical heater, steam generation unit and/or another heating element, or any combination of elements. The heating system 340 can use any suitable heating mechanism.

In a first embodiment, the heating system 340 can use radiation (e.g., IR heaters, heated fins, hydronic heating systems, radiators, heat exchangers, heat pumps, boilers, etc.) to heat the sorbent within the sorption cavity.

In a second embodiment, the heating system 340 can use convection (e.g., forced air heating, heat pumps, hydronic heating systems, radiators, heat exchangers, heat pumps, boilers, etc.) to heat the sorption cavity and/or the sorbent structure.

In a third embodiment, the heating system 340 can use conduction (e.g., electric resistance heaters, etc.), compression, and/or another suitable heating mechanism to heat the sorbent structure and/or sorbent directly.

Figure 11:
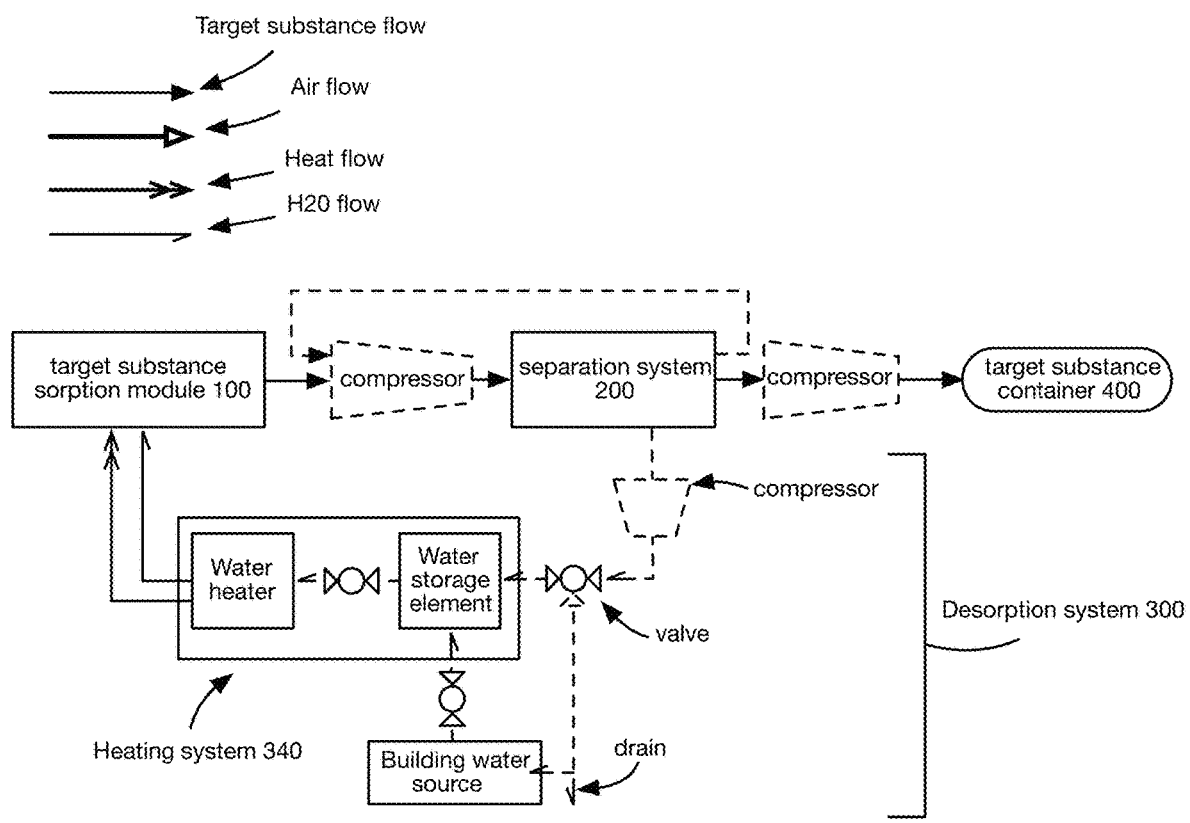
FIG. 11 is a schematic representation of a variant of the desorption system.

In a fourth embodiment, the heating system 340 includes a steam generation unit. The steam generation unit functions to heat the sorbent by heating stored or collected water to generate steam and injecting the generated steam into the sorption module 100, quickly and evenly distributing heat between MECS capsules (e.g., example shown in FIG. 11). The steam generation unit can heat stored water for 10 seconds, 30 seconds, 1 minute, 2 minutes, 5 minutes, 10 minutes, 15 minutes, 20 minutes, 40 minutes, 60 minutes, within any open or closed range bounded by any of the aforementioned values, and/or any other suitable range. The steam generation system can inject steam into the sorption module 100 for 5 minutes, 10 minutes, 15 minutes, 30 minutes, 40 minutes, 60 minutes, 100 minutes, within any open or closed range bounded by any of the aforementioned values, and/or any other suitable range. The generated steam can be wet steam and/or dry steam. The generated steam can be 30° C., 50° C., 70° C., 80° C., 90° C., 100° C., 110° C., 115° C., 120° ° C., 125° C., 130° C., 140° C., 160° C., 180° C., 200° ° C., within any open or closed range bounded by any of the aforementioned values (e.g., 70-110°C for wet steam, 100-160° C. for dry steam, 110-130° C. for wet and/or dry steam, etc.), and/or any other suitable range. The system can use the same or different temperature for wet steam and dry steam. The steam can be generated from water stored in the heating fluid chamber, a boiler, and/or another water storage device. The volume of the heating fluid chamber can be 0.5 L, 1 L, 2 L, 3 L, 5 L, 10 L, 20 L, 100, within any open or closed range bounded by any of the aforementioned values, and/or any other suitable range. In a first variant, steam can be generated by a building steam generation system (e.g., a district heating system 340, a boiler, and/or another process). In a second variant, steam can be generated from water which was used to generate steam in a prior iteration of the method and separated using a separation system 200 in a prior iteration of the method. In a third variant, the steam can be generated from a partially-closed loop (e.g., wherein some water was re-used, and some water is replenished from an outside source). However, the water can come from any other suitable source.

The steam generation unit can heat water by igniting natural gas, using direct or indirect solar radiation, using electric power, using geothermal heat, using a microwave, using a heat pump, using waste heat and/or using another active or passive heat source. The steam generation unit can heat water at any suitable time relative to modes of the sorption module, the time of water vapor injection into the sorption cavity, and/or any other suitable time. In a first variant, the steam generation unit heats water within the heating fluid chamber and exhausts the generated water vapor into the sorption cavity. In a second variant, the steam generation unit system quickly heats water within the sorption cavity. In a third variant, the steam generation unit heats moving. water as it flows into the sorption cavity (e.g., a heated nozzle). However, the steam generation unit can otherwise heat the water. The steam generation unit can be controlled directly or indirectly by the controller and/or a building management system.

The steam generation unit can heat water at any suitable time(s). In a first variant, the steam generation heats water constantly (e.g., during all operation modes of the sorption module 100). In a second variant, the steam generation unit starts heating water responsive to a condition (e.g., a time-based condition, a temperature condition, a target substance concentration condition, etc.), where a condition can be a threshold or another suitable type of condition. In a third variant, the steam generation unit heats water responsive to another building system and/or system component performing cooling (e.g., transferring heat with a heat pump). In a fourth variant, the steam generation unit heats water responsive to another building system and/or system component performing heating. In a fifth variant, the steam generation unit heats water responsive to a sorption module mode change (e.g., a change to the desorption mode and/or regeneration mode). However, the steam generation unit can be otherwise configured.

Figure 4:
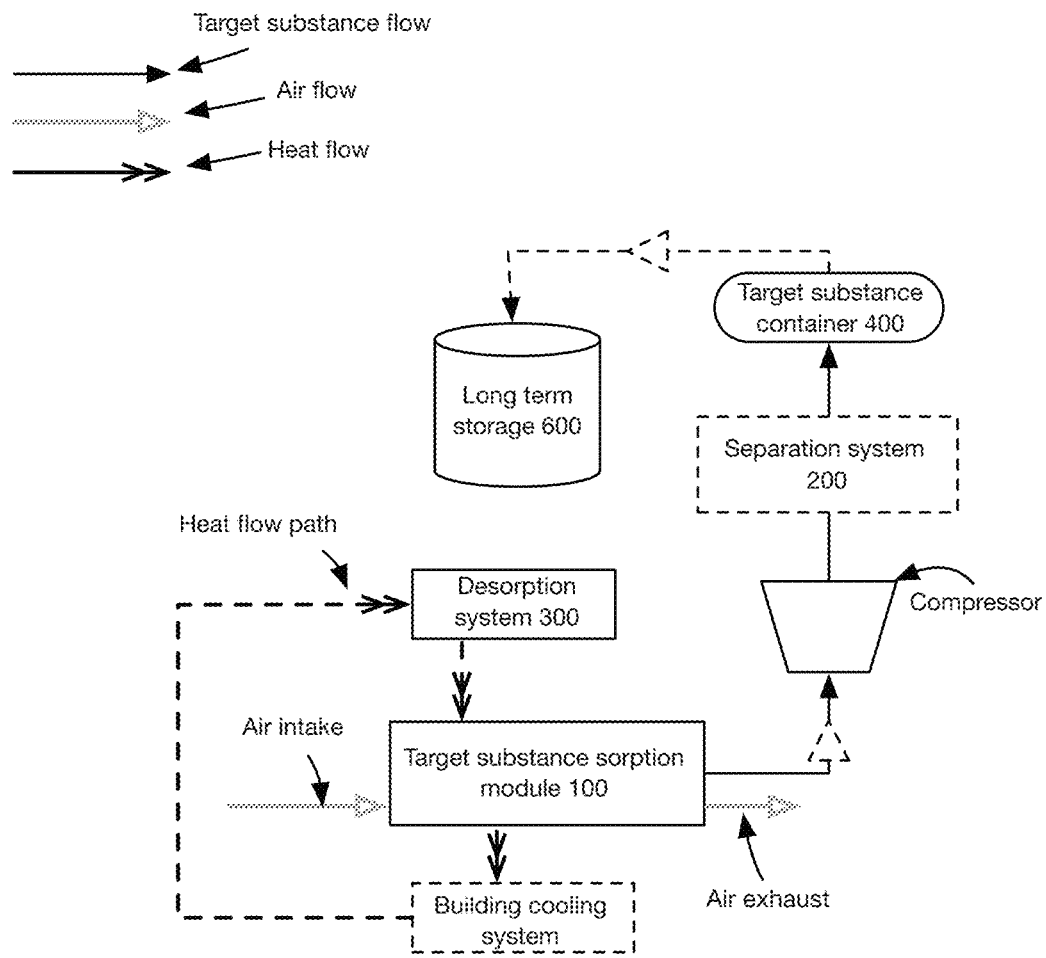
FIG. 4 is a schematic representation of an illustrative example of system components.

In variants, the heating system 340 can be integrated into the building heating and cooling system (e.g., example shown in FIG. 1, FIG. 3, and FIG. 4). In a variant, the heating system 340 can receive building exhaust heat from the building cooling system and/or can receive part of the heat generated by the boiler or other building heating system 340. In a second variant, the heating system 340 can reject heat to the building heating system 340. However, the heating system 340 can otherwise interact with a building temperature management system.

The heating system 340 can use any combination of the aforementioned embodiment or can be otherwise configured.

In a third variant, the desorption system 300 can include an electrochemical system, wherein electrical power is applied to the sorbent material to desorb the target substance from the sorbent material. The desorption parameters (e.g., voltage, current, polarity, frequency, duration, etc.) can be determined based on the target substance (e.g., to prevent substance decomposition), the sorbent material (e.g., to desorb more than a threshold proportion of the target substance but prevent sorbent material decomposition, etc.), and/or otherwise determined.

The optional cooling unit 350 functions to cool the sorbent after desorption in order to prepare it for sorption. The cooling unit 350 can be active or passive. The cooling unit can be the cooling system 500, can be fluidly connected to the cooling system 500 (e.g., via a refrigeration loop/cycle for a heat pump which either trades heat between the cooling unit 350 and cooling system 500 or provides cooling for both the cooling unit 350 and the cooling system 500 concurrently), can be a component within the cooling system 500, be any combination, and/or be any other suitable component(s). In a variant, the cooling unit is a heat loss-maximizing structure (e.g., fins, heat sinks, etc.) incorporated within the sorption module and/or sorbent structure which facilitates heat loss between the sorbent and the environment in which the sorption module is placed. In an example of this variant, the cooling unit is fins. However, the cooling unit can be otherwise configured.

However, the desorption system 300 can be otherwise configured.

3.4 Cooling System

The system can optionally include one or more cooling systems 500, which function to cool the target substance, the sorption module 100, the sorbent, and/or other components in the system. The cooling system 500 can cool and be thermally connected to any suitable cooling target. The cooling target can be: a cavity within the sorption module 100, the sorbent structure, a flow channel between two elements (e.g., a pre-compressor channel or a post-compressor channel), the target substance container 400, and/or the long term storage 600. The cooling system 500 can cool multiple sorption cavities, target substance containers, and/or other system components within the same system or a different system. The cooling system 500 can be modular. The cooling system 500 can be the same component as the cooling unit 350 or a distinct component. The system can include multiple cooling systems 500 with the same or different cooling targets.

The cooling system 500 can reject heat to any suitable heat rejection target, including the heating system 340, steam generation unit, sorption cavity, HVAC system (e.g., during heating), indoor air, outdoor air, a heat sink, a heat reservoir (e.g., a boiler), a building temperature management system, and/or any other suitable system component. The heat rejection target can change responsive to signals from a controller, HVAC valves opening and/or closing, a heat pump direction switch, a manual control, and/or any other suitable signal.

The cooling system 500 can include a fluid-cooled heat exchanger, an evaporative cooling system, a cryogenic cooling system, a radiative cooling system, and/or any other suitable type of cooling system.

In a specific example, the cooling system 500 uses compressed captured target substance as refrigerant in a refrigeration cycle (e.g., a loop of fluid refrigerant which repeats heating and/or cooling in a cycle). In this example, the cooling system 500 cools the purged target substance after the target substance leaves the sorption module 100. However, the cooling system 500 can be alternatively configured.

3.5 Separation System

The system can include a separation system 200, which functions to purify the target substance after desorption. The separation system 200 can include changing temperature, changing pressure, draining, and/or any other suitable process. In a first variant, the separation system 200 separates the target substance from air. In a second variant, the separation system 200 separates the target substance from water. In a third variant, the separation system 200 separates the target substance from other substances sorbed during the sorption process. However, the separation system 200 can separate the target substance from any suitable substance(s).

The separation system can comprise an intake channel, an exhaust channel, a water drainage port (e.g., a water outlet), a separation mechanism (e.g., a filter or a condensation element) and/or any other suitable components.

The separation system 200 can be located within the sorption cavity, a flow path, the compressor, a target substance container 400, a dedicated separation chamber, and/or any other suitable location. The separation system 200 can perform separation during target substance desorption, after target substance desorption, and/or at any other suitable time. The separation system 200 can alternatively perform separation responsive to the availability of the cooling system 500. However, the separation system 200 can perform separation in any suitable location and/or at any suitable time.

Figure 12A:
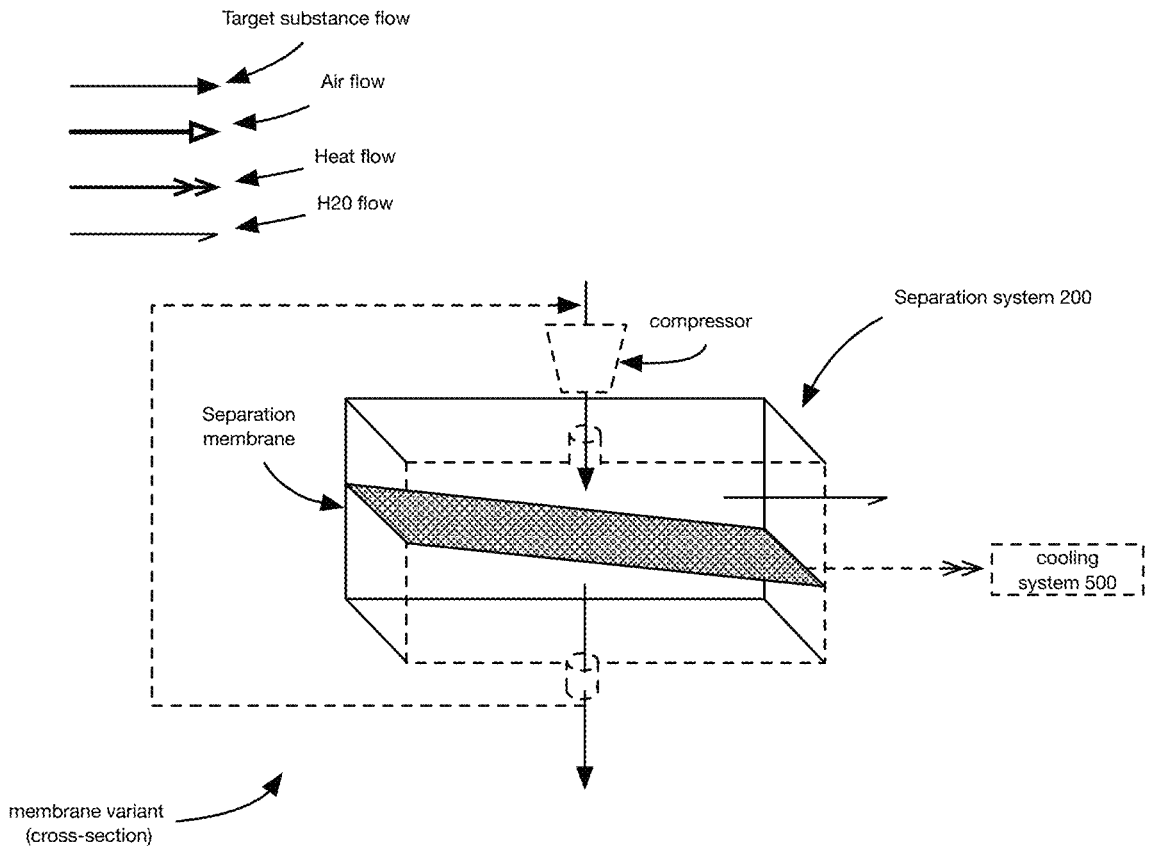
FIGS. 12A and 12B are schematic representations of variants of the separation system.
Figure 12B:
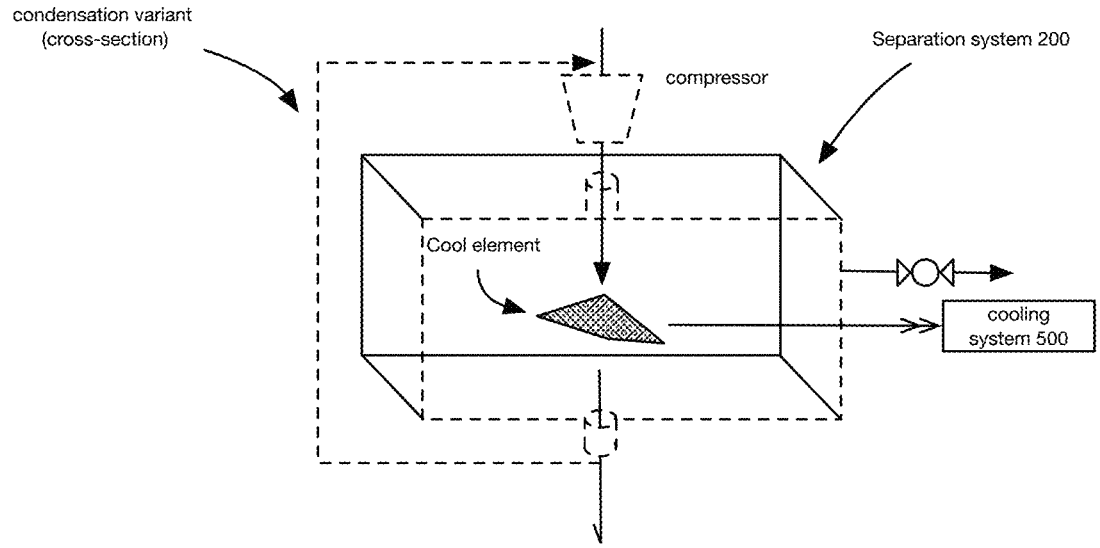

The separation system 200 can perform separation using any suitable method(s). In a first variant, the separation system 200 includes a selective membrane which filters the target substance from a mixed substance (e.g., example shown in FIG. 12A). In an example, the selective membrane allows the target substance to pass through but does not allow water to pass through. Examples of membranes include polymer membranes, mixed matrix membranes (e.g., layered double hydroxide membranes, zeolite membranes, etc.), microporous organic polymer membranes, carbon molecular sieves, ionic liquid membranes and/or any other membrane type or combination of membrane types. The membrane pore size can be 0.2 nm, 0.32 nm, 0.35 nm, 0.38 nm, 0.40 nm, 0.43 nm, 1 nm, 2 nm, within any open or closed range bounded by any of the aforementioned values, and/or any other suitable range. In a second variant, the separation system 200 uses condensation (e.g., example shown in FIG. 12B). In this variant, the separation system 200 passes the mixed substance over a condensation element (e.g., a stream of water) which is cooler than the mixed substance (e.g., by 1° C., 5°C, 10° C., 20° C., 50° C., 100° C., by a value within any open or closed range bounded by any of the aforementioned values, and/or any other suitable range). condenses a non-target substance (e.g., water). In this variant, the separation system 200 can use the cooling system 500, the cooling unit 350, and/or a separation-specific cooling system 500 as a cooling mechanism to cool the condensation element. Alternatively, the condensation element can be not cooled (e.g., the condensation element is room-temperature water taken from a building system). In an example of this variant where the condensation element is a stream of water, the same water source is used to generate the water vapor and the condensation element. The cooling mechanism can be thermally connected to the heating system 340 and cools the condensation element while the heating system heats the stored water (e.g., where heat is transferred from the condensation element to the water). The temperature of the condensation element can be 0° C., 10° C., 20° C., 30° C., 40° C. 60° C., 80° C., 99° C., 101° C., 150° C., within any open or closed range bounded by any of the aforementioned values, and/or any other suitable range. In a specific example of this variant, liquid water is sprayed into the mixed substance (e.g., the substance in the sorption cavity after desorption) to cool and draw out water vapor as liquid water. In a third variant, the separation system 200 uses pressure swing adsorption, wherein the target substance is selectively adsorbed onto a sorbent (e.g., carbon nanotubes, activated carbon, graphite, etc.) while water vapor passes across the sorbent without being sorbed. In a first example of this variant, the separation system 200 is integrated into the sorption module and occurs during the sorption mode. In a second example of this variant, the separation system 200 sorbs the target substance after the target substance is desorbed from the sorbent structure (e.g., in the desorption mode and/or regeneration mode) and removed from the sorption cavity (e.g., in the target substance removal mode). In a fourth variant, the separation system 200 includes a target substance scrubber. In this variant, a target substance scrubber is an amine solution which can efficiently capture the target substance while keeping the non-target substances within the mixed substance (e.g., water) in the gaseous phase. In an example of this variant, a centrifugal apparatus can be used to further separate the CO2-rich amine solution. In another example of this variant, the amine solution can be further heated to release the target substance in gaseous state. However, the separation system 200 can use any combination of the aforementioned variants in sequence and/or any other suitable method for separating the target substance out of a mixed substance.

In variants where the separation system 200 separates the target substance from water, the separation system 200 can collect the water, drain the water, re-use the water using the steam generation unit and/or cooling system 500, and/or otherwise use or dispose of the water. In a first variant, the separation unit can expel water through the water drainage port and/or any other suitable port. In a second variant, the water drainage port is fluidly connected to the heating system 340, and the heating system 340 stores and re-heats the stored water to generate steam in a next iteration of the method. However, the separation system can otherwise dispose of the water and/or other non-target substance.

3.6 Compressors/Pumps

The system can additionally include one or more compressors (e.g., pumps) which function to pressurize the target substance desorbed from the sorption module 100. In variants, the compressors can be piston compressors, rotary compressors, centrifugal compressors, diaphragm compressors, and/or any other suitable type of compressor. A compressor (e.g., a pressurization system) can optionally pressurize the target substance to a supercritical state (e.g., at 70 bar, 76 bar, 80 bar, 90 bar, 100 bar, within any open or closed range bounded by any of the aforementioned values, below 70 bar, above 100 bar, and/or any other suitable range). A compressor can be connected to any of: the sorption module 100, cooling system 500, the target substance container 400, long term storage 600, and/or any other point along a flow path. A compressor can be arranged in parallel or in series with (e.g., before and/or after) the sorption module 100, a target substance container 400, the cooling system 500, and/or any other suitable component. The compressor is preferably arranged in parallel with and/or is not directly fluidly connected to the purge system but can be otherwise arranged.

In a first variant, multiple compressors (e.g., two compressors) in series can pressurize target substances to an intermediate pressure using the first compressor (e.g., 10 bar, 50 bar, 70 bar, 76 bar, 80 bar, 100 bar, 126 bar, within any open or closed range bounded by any of the aforementioned values, below 70 bar, above 130 bar and/or any other suitable range) and can pressurize target substances from the intermediate pressure to a target pressure using a second compressor (e.g., 70 bar, 76 bar, 80 bar, 90 bar, 100 bar, 110 bar, 120 bar, 126 bar, within any open or closed range bounded by any of the aforementioned values, below 70 bar, above 130 bar and/or any other suitable range). In an example of this variant, the second compressor is part of the refrigeration cycle to which a heating and/or cooling system 500 is attached (e.g., as shown in FIG. 1 and FIG. 3). In a specific example, the second compressor is part of a heat pump. In a second variant, a single compressor can compress the desorbed target substances from a first pressure to a target pressure (e.g., within the aforementioned target pressure ranges) (e.g., as shown in FIG. 4).

Compressors can function to move the target substance between any suitable set of system components (e.g., the sorption module 100 and separation system 200, as shown in FIG. 10D) during any suitable step. In an example, a compressor facilitates transport of a target substance and water mixture from the sorption module 100 to the separation system 200. However, the compressors can be otherwise configured.

3.7 Target Substance Treatment Systems

The system can additionally include one or more target substance treatment systems which function to filter, cool, dehumidify, and/or perform other treatment operations on the target substance. In variants, the separation system 200, cooling system 500, cooling unit 350, and compressors are target substance treatment systems. The target substance treatment systems can be connected in parallel and/or in series with any suitable element of the system. In a specific example, the system includes a target substance filtration system, target substance cooling system 500, target substance separation system 200 and/or a target substance dehumidification system fluidly connected to the sorption module 100 and which treats the target substance as the target substance passes from the sorption module 100 to the first compressor (e.g., as shown in FIG. 1 and FIG. 3). However, the system can include other suitable types of treatment systems.

3.8 Target Substance Container

The system can optionally include a target substance container 400, which functions to contain liquid, gaseous, solid, and/or target substances. The target substance container 400 can preferably contain target substances short-term but alternatively long-term. The target substance container 400 can be connected to any of: compression system, heat pump (e.g., in a refrigeration loop/cycle), long-term storage, and/or any other suitable fluid volume. The target substance container 400 can be inside of the refrigeration loop but can alternatively be outside of the refrigeration loop. The pressure within the target substance container 400 (e.g., the storage pressure) can be 1 bar, 2 bar, 10 bar, 50 bar, 70 bar, 76 bar, 100 bar, 150 bar, 200 bar, 250 bar, 300 bar, 350 bar, 400 bar, intermediate pressure, target pressure, within any open or closed range bounded by any of the aforementioned values, below 1 bar, above 400 bar, and/or any other suitable range. The target substance container 400 can be thermally insulated or not thermally insulated. Target substance flow into and/or out of the target substance container 400 can be controlled by active or passive valves. The target substance container 400 can optionally include an overflow valve fluidly connected to a long-term storage system. However, the target substance container 400 can be alternatively configured.

3.9 Long-Term Storage

The system can optionally include long-term storage 600, which functions to store the target substance for an extended period of time. The long-term storage 600 can be the same container or a different container than the target substance container 400. In variants, the long-term storage 600 can connect to the target substance container 400 directly or can be fluidly isolated from the target substance container 400 (e.g., wherein the target substance is transported to the long-term storage 600 via canister, etc.). Flow in a flow channel between the target substance container 400 and the long-term storage 600 can be actively or passively controlled by a valve (e.g., a check valve). The long-term storage 600 can be a tank, building temperature management refrigeration system (e.g., as refrigerant, wherein the refrigeration system uses the supercritical target substance in a refrigeration cycle), pipeline, and/or another suitable type of long-term storage 600. However, the long-term storage 600 can be alternatively configured.

3.10 Sensors

The system can optionally include one or more sensors, which function to monitor fluid (e.g., air) and system state. Examples of sensors that can be used include air composition sensors (e.g., gas concentration sensors, gas detection sensors, molecule detection sensors, etc.), temperature sensors, pH sensors, pressure sensors, flow meters, leak detectors, humidity sensors, cameras, and/or any other suitable sensor type. Sensors can be located within, in series with, before, and or after: the sorption module 100, cooling system 500, compressors, intake channel, air exhaust channel, target substance exhaust channel, desorption system 300, purging system 700, heating system 340, cooling system 500, target substance container 400, long term storage 600, at valves, in the building, outside the building, and/or in any component connecting any of the aforementioned components and/or locations. In an example, a pair of sensors in the air flow path passing through the sorption module 100 on either side of the sorbent detect differences in air quality (e.g., target substance concentration, pH, temperature). Sensors can be communicatively connected to any of the aforementioned elements and/or a controller. Any process of the method can be triggered and/or stopped responsive to sensor measurements meeting a threshold or condition. In an example, the desorption process ends when the pressure within the sorption cavity crosses a threshold value. However, the sensors can be alternatively configured.

3.11 Controller

The system can optionally include or be used with one or more controllers, which function to control air and heat flow through the system. The controller can be a local and/or remote processing system. In a first example, the controller is a building management system. In a second example, the controller can operate in communication with a building management system. In this example, the controller can use building management system setpoints, can be calibrated alongside the building management system, and/or can send information from sensors and/or a building model to the building management system. The controller can be physically, electrically, and/or communicatively connected to any system component and/or a subset of system components. The controller can be the same as or separate from a controller for the working volume (e.g., a building management system controller), wherein the controller can interface with the working volume controller in the latter variant. The controller can selectively control system components to change system performance. The controller can directly control elements and/or can instruct users to control elements. In an example, the controller can determine when the sorption module 100 switches between steps of the method and/or modes of operation (e.g., the sorption mode, desorption mode, pressurization mode, regeneration mode, target substance removal mode, cooling mode, etc.). Additionally, the controller can determine when the air intake channel and air outflow channel switch between modes (e.g., indoor sorption mode, outdoor sorption mode, etc.). In an example, the controller can switch the working volume of the air intake channel from outdoor air to indoor air when indoor air has a higher target substance concentration than outdoor air (e.g., and vice-versa). In a second example, the controller can adjust the flow rate of air passing through the sorption module 100 by changing blower power, changing the cross-sectional area of flow in the intake channel, and/or using any other suitable mechanism. In a third example, the controller can adjust the desorption speed by controlling the heating element to change the amount of heat being provided to the sorption module (e.g., changing the amount and/or temperature of steam injected into the sorption cavity). In a fourth example, the controller can selectively control the flow channels (e.g., valves) of multiple sorption modules 100 in sync. In this example, one sorption module 100 can close the air intake channel to a working volume at the same time as another sorption module 100 opens an air intake channel to the working volume.

The controller can additionally collect sensor data and/or control data to determine and/or refine a model of sorption module performance and/or a model of the building. The controller can use the model to determine sorption module controls, but the controller can alternatively use the model for other purposes.

The controller can operate elements based on: a schedule (e.g., time-based controls), building occupancy (e.g., while occupancy is low, the controller can instruct air intake system to intake more outdoor air), air quality observations (e.g., data from CO2 concentration sensors, temperature sensors, pressure sensors, etc.), user input, and/or objectives (e.g., air quality, cost, environmental efficiency, energy usage, system longevity, and/or other metrics). The controller can route intake air through alternating flow channels during desorption of a sorbent. The controller can halt direct air capture (e.g., the method) when an abnormality is detected by the sensors, when the long-term storage is full (e.g., when pressure in the long term storage 600 reaches a threshold value), when the target substance container 400 is full, when an energy expenditure limit is reached, when the building and/or sorption module 100 enters an energy-saving mode, when the indoor concentration of the target substance reaches a threshold, and/or responsive to any other suitable condition. However, the controller can be alternatively configured.

However, the system can be alternatively configured.

4. Method

The method functions to remove a target substance from air (e.g., indoor air, outdoor air, etc.). The method can include: drawing air into a sorption module S100, sorbing a target substance from the air S200, purging air from the sorption module S300, desorbing the target substance from the sorbent S400, purifying the target substance S500, pressurizing the target substance S600, cooling the target substance S700, and storing the target substance S800. One or more processes of the method from successive iterations of the method can occur contemporaneously but can additionally or alternatively occur serially or with any other suitable temporal relationship. The method is preferably performed by components of the sorption module 100 described above but can alternatively be performed by any other suitable system.

Drawing air into a sorption module S100 functions to draw air into a sorption cavity within a sorption module 100 or into a space in contact with a sorption module 100 (e.g., example shown in FIG. 10A). S100 can be performed actively by a blower, compressor, or another suitable pressurization system or passively using the motion of air in an HVAC system or in a building space. However, S100 can be performed by any other suitable system component. During S100, the air intake channel and the air exhaust channel are preferably open, but either or both of the two channels can alternatively be closed. S100 can preferably be performed during the sorption process S200 but can alternatively be performed at any other suitable time. However, drawing air into a sorption module 100 can be alternatively performed.

Sorbing a target substance from the air S200 functions to reduce the concentration of a target substance (e.g., CO2) from the air which was drawn into the sorption module 100 in S100 (e.g., as shown in FIG. 10A). During S200, the sorbent sorbs the target substance from flowing air received at the intake channel. S200 can be performed by a sorbent and/or sorbent structure within a sorption cavity of the sorption module 100. In a preferred variant, air flowing out of the sorption module 100 during S200 can have a lower target substance concentration than air flowing in. The reduction in concentration of the target substance between the intake channel and exhaust channel can be 50%, 70%, 80%, 90%, 95%, 99%, 99.9%, within any open or closed range bounded by any of the aforementioned values, and/or any other suitable value.

S200 can be performed at any time(s). In a first variant, S200 is performed at the same time as S100. In a second variant, S200 is performed after S100. However, S200 can be performed at any other suitable time. S200 can be performed any suitable number of times. In a first variant, air flows into the sorption cavity via the air intake channel and flows out of the air exhaust channel without flowing back into the intake channel. In a second variant, the sorption module air channels direct air flowing out of the exhaust channel back into the air intake channel, creating a cycle wherein S200 repeats for the same volume of air. In a third variant, the air intake channel and/or air exhaust channel close (e.g., using a valve) and a blower cycles air within a closed sorption cavity. However, S200 can be performed any other suitable number of times for a given air volume.

However, S200 can be alternatively performed.

Purging air from the sorption module S300 functions to remove excess air from the sorption module 100 (e.g., example shown in FIG. 10B). S300 can preferably be performed by the purging system 700 but can alternatively be performed by any other suitable mechanism. In a variant, S300 is not performed at all. S300 can preferably occur after the air intake channel and air exhaust channel are closed (e.g., to prevent additional air from filling space left by purged air) but can alternatively occur while one or both of the air intake channel and air exhaust channel are open. In a preferred variant, only the purging channel is open during S300. However, any other suitable number of any suitable type of channel can be open during S300.

S300 can preferably start after S100 stops, but S300 can alternatively start at any other suitable time(s). In variants, S300 can start responsive to an instruction from the controller, a time-based condition (e.g., after S200 and/or S100 has been performed for a given time, etc.), a sensor measurement crossing a threshold value (e.g., a difference in concentration of CO2 between sensors in the air intake channel and air exhaust channel, etc.), and/or any other suitable condition. S300 can preferably stop before S400 starts, but S300 can alternatively stop at any other suitable time. In variants, S300 can stop responsive to an instruction from the controller, a time-based condition (e.g., after S300 has been performed for a given time), a sensor measurement crossing a threshold value (e.g., when pressure within the sorption cavity falls below the vacuum threshold value), and/or any other suitable condition. S300 preferably stops when the pressure within the sorption cavity crosses a threshold vacuum value. However, S300 can alternatively include stopping the pump and maintaining the pressure within sorption module at the threshold vacuum value for an extended period. The term "threshold vacuum value" can refer to a measured pressure and/or an average pressure over the extended period or another suitable period. The extended period can be 10 seconds, 30 seconds, 1 minute, 5 minutes, 10 minutes, within any open or closed range bounded by any of the aforementioned values, and/or any other suitable range. The threshold vacuum value can be 90 torr, 150 torr, 230 torr, 300 torr, 400 torr, 450 torr, 500 torr, 550 torr, 600 torr, 650 torr, 700 torr, 720 torr, 750 torr, within any open or closed range bounded by any of the aforementioned values (e.g., 500-720 torr, 350-720 torr, 90-720 torr, etc.) and/or any other suitable range. The threshold vacuum value can be above 350 torr and/or any of the aforementioned values in order to protect the MECS from bursting. However, S300 can stop at any other suitable time.

However, S300 can be alternatively performed.

Desorbing the target substance from the sorbent S400 functions to remove the sorbed target substance from the sorbent (e.g., example shown in FIG. 10C. S400 can be performed by the desorption system 300 but can alternatively be performed by any other suitable system or system component. S400 can preferably start when S300 stops (e.g., responsive to the same conditions under which S300 stops), but S400 can alternatively start at any other suitable time. In variants, S400 can stop after a threshold amount of heat has been added to the sorption cavity, after a threshold amount of water has been added to the sorption cavity, after the sorption cavity reaches a threshold temperature, after a predetermined amount of time, after the concentration of the target substance in the sorption cavity reaches a threshold value, and/or responsive to any other suitable condition. S400 can preferably be performed while the sorption module is in the regeneration mode.

However, S400 can be alternatively performed.

Purifying the target substance S500 functions to separate the desorbed target substance from other substances (e.g., water) (e.g., example shown in FIG. 10E). S500 can be performed within the separation system 200, within the sorption module 100, and/or within any other system or system component. S500 can be performed concurrently with S400, S600, and/or S700; after S400, S600, and/or S700, and/or at any other suitable time. S500 can be performed on a given volume of air once or multiple times until a condition is reached (e.g., humidity, number of iterations of S500, etc.). However, S500 can be alternatively performed.

Pressurizing the target substance S600 functions to pressurize the desorbed target substance to the target pressure, intermediate pressure, and/or any other suitable pressure value (e.g., example shown in FIG. 10F). During S600, the target substance can change state to gas, liquid, supercritical fluid, and/or any other suitable state. S600 can be performed concurrently with S400, S500, and/or S700; after S400, S500, and/or S700, and/or at any other suitable time. S600 can be performed on a given volume of air once or multiple times until a condition is reached (e.g., humidity, number of iterations of S500, etc.). However, S600 can be alternatively performed.

S600 can preferably be performed by the compressor or a set of compressors. In a first variant, S600 is performed by one compressor. In a second variant, S600 is performed by two compressors in series, wherein the first compressor compresses the target substance to an intermediate pressure and wherein the second compressor compresses the target substance at the intermediate pressure to a target pressure. However, S600 can be performed by any other suitable number of compressors.

However, S600 can be alternatively performed.

Cooling the target substance S700 can function to reduce the temperature of the target substance (e.g., example shown in FIG. 10G). S700 can additionally function to change the phase of the target substance (e.g., to a liquid or supercritical state). S700 can be performed by the cooling system 500, cooling unit 350, and/or any other suitable system. S700 can be performed concurrently with S400, S500, S600, and/or S800; after S400, S500, and/or S600, and/or at any other suitable time. However, S700 can be alternatively performed.

Storing the target substance S800 can function to retain the target substance for use, later use, and/or disposal. S800 can be performed by the target substance container 400, long term storage 600, and/or another form of storage. Storing the target substance can include storing the substance statically (e.g., in a tank) and/or dynamically (e.g., in a refrigeration loop/cycle or pipeline). However, the target substance can be otherwise stored. Any other process of the method can be performed on the target substance concurrently with S800 (e.g., the stored target substance can be re-pressurized). The target substance can be stored in a gaseous, liquid, and/or supercritical state. However, S800 can be alternatively performed.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system comprising an air treatment module comprising:
 a sorption cavity;
 an intake channel connected to the sorption cavity;
 a sorbent structure in the sorption cavity, the sorbent structure comprising micro-encapsulated carbon sorbent;
 a heating system configured to store and heat water;
 a pump; and
 a separation system comprising a water outlet, the separation system configured to separate gaseous carbon dioxide from steam;

wherein the air treatment module is operable between a set of modes, the set of modes comprising:
a sorption mode, wherein:
the intake channel is open to an air source; and
the micro-encapsulated carbon sorbent sorbs carbon dioxide from flowing air received at the intake channel; and
a desorption mode, comprising:
a purging mode, wherein
the intake channel is closed to the air source;
the pump pumps air out of the sorption cavity until a sorption cavity pressure reaches a threshold value between 350 torr and 760 torr; and
a regeneration mode, wherein
the intake channel is closed to the air source;
the heating system injects steam into the sorption cavity;
the sorbent structure desorbs gaseous carbon dioxide into the sorption cavity; and
wherein the separation system separates water from the desorbed gaseous carbon dioxide and drains the separated water using the water outlet.

2. The system of claim 1, wherein the water outlet is fluidly connected to the heating system and wherein the separated water is re-used by the heating system to generate steam in a next iteration of the method.

3. The system of claim 1, wherein in the sorption mode, the intake channel is operable between at least:
an indoor sorption mode, wherein the air source is interior air of a building; and
an outdoor sorption mode, wherein the air source is outdoor air external to the building.

4. The system of claim 3, wherein the intake channel is configured to switch between the indoor sorption mode and the outdoor sorption mode based on a number of people within the building.

5. The system of claim 3, wherein the intake channel is configured to switch between the indoor sorption mode and the outdoor sorption mode based on a schedule.

6. The system of claim 3, wherein the intake channel is configured to switch between the indoor sorption mode and the outdoor sorption mode based on a concentration of carbon in the interior air of the building.

7. The system of claim 1, wherein the separation system comprises a cooling system, and wherein the cooling system separates water from the desorbed gaseous carbon dioxide by cooling the separation element.

8. The system of claim 7, wherein the cooling system is thermally connected to the heating system and wherein the cooling system cools the separation system while the heating element heats the stored water.

9. The system of claim 1, additionally comprising a pressurization system which is configured to pressurize the gaseous carbon dioxide to supercritical carbon dioxide at a pressure of at least 76 bar.

10. The system of claim 9, wherein the pressurization system is fluidly connected to a building temperature management refrigeration system via the supercritical carbon dioxide and the building temperature management system uses the supercritical carbon dioxide as refrigerant in a refrigeration cycle.

11. The system of claim 1, additionally comprising a second air treatment module, wherein the second air treatment module operates in the desorption mode while the air treatment module operates in the sorption mode.

12. The system of claim 11, wherein the air treatment module heating system and the second air treatment module heating system are thermally connected.

13. The system of claim 1, wherein switching between the sorption mode and the desorption mode is controlled by a building management system.

14. A method for removing carbon dioxide from air, comprising
a) drawing flowing air into an air treatment module from an air source through an air intake channel;
b) sorbing carbon dioxide from the flowing air using micro-encapsulated carbon sorbent;
c) closing the air intake channel, thereby fluidly isolating the air treatment module from the air source;
d) using a pump, removing air from the air treatment module;
e) using a heating system, injecting water vapor into the air treatment module, wherein the micro-encapsulated carbon sorbent desorbs carbon dioxide into the air treatment module;
f) using the pump, removing a mixture comprising the water vapor and carbon dioxide from the air treatment module; and
g) using a separation module, separating the water vapor-carbon dioxide mixture into water and carbon dioxide.

15. The method of claim 14, wherein the water vapor in step e) comprises the separated water vapor generated from step g) from a prior iteration of the method.

16. The method of claim 14, additionally comprising pressurizing the separated carbon dioxide to a storage pressure, wherein the storage pressure is above 70 bar.

17. The method of claim 14, wherein the separation module separates the water vapor from the carbon dioxide using a selective membrane.

18. The method of claim 14, wherein the air source alternates between indoor air and outdoor air, and wherein the air source is determined by a building management system.

19. The method of claim 18, wherein the building management system switches the air source to indoor air when indoor air has a higher carbon dioxide concentration than outdoor air.

20. The method of claim 14, additionally comprising storing the separated carbon dioxide in a supercritical state and using the separated carbon dioxide as refrigerant in a building refrigeration cycle.

* * * * *